(12) United States Patent
Matsumoto

(10) Patent No.: US 8,186,652 B2
(45) Date of Patent: May 29, 2012

(54) GAS AND LIQUID MIXTURE GENERATION APPARATUS

(75) Inventor: Osamu Matsumoto, Kamagaya (JP)

(73) Assignee: Osamu Matsumoto, Nishi-michinobe, Kamagaya-shi, Chiba (JP)

( * ) Notice: Subject to any disclaimer, the term of this patent is extended or adjusted under 35 U.S.C. 154(b) by 782 days.

(21) Appl. No.: 12/223,350

(22) PCT Filed: Feb. 5, 2007

(86) PCT No.: PCT/JP2007/051895
§ 371 (c)(1),
(2), (4) Date: Jan. 2, 2009

(87) PCT Pub. No.: WO2007/089013
PCT Pub. Date: Aug. 9, 2007

(65) Prior Publication Data
US 2009/0294996 A1    Dec. 3, 2009

(30) Foreign Application Priority Data

Feb. 3, 2006    (JP) .................................. 2006-026451

(51) Int. Cl.
*B01F 3/04*    (2006.01)
(52) U.S. Cl. ...................................... 261/79.2
(58) Field of Classification Search .................. 261/76, 261/79.1, 79.2, 123
See application file for complete search history.

(56) References Cited

U.S. PATENT DOCUMENTS

| | | | | |
|---|---|---|---|---|
| 175,827 A * | 4/1876 | Deeds et al. | .................. | 261/153 |
| 2,653,801 A * | 9/1953 | Fontein et al. | ................. | 366/139 |
| 3,548,569 A * | 12/1970 | Jepsen et al. | .................... | 96/228 |
| 3,775,314 A * | 11/1973 | Beitzel et al. | .................. | 210/760 |
| 3,844,721 A * | 10/1974 | Cariou et al. | .................. | 422/198 |
| 4,214,982 A * | 7/1980 | Pfalzer | .......................... | 209/164 |
| 4,267,131 A * | 5/1981 | Prudhon et al. | ............... | 261/153 |
| 4,668,441 A * | 5/1987 | Hess et al. | ..................... | 261/79.2 |
| 4,880,451 A * | 11/1989 | Konijn | ............................. | 96/306 |
| 5,591,348 A * | 1/1997 | Felder et al. | .................. | 210/704 |
| 5,783,118 A * | 7/1998 | Kolaini | ........................... | 261/37 |
| 6,382,601 B1* | 5/2002 | Ohnari | ......................... | 261/79.2 |
| 7,261,283 B1* | 8/2007 | Ohnari | ........................ | 261/79.2 |

FOREIGN PATENT DOCUMENTS

| | | |
|---|---|---|
| JP | H08-229458 | 9/1996 |
| JP | H08-229459 | 9/1996 |
| JP | H13-179286 A | 7/2001 |
| JP | H13-205063 A | 7/2001 |
| JP | 2002-143658 | 5/2002 |
| JP | H15-126665 A | 5/2003 |
| JP | 2003-181258 | 7/2003 |
| JP | 2003-225546 | 8/2003 |

(Continued)

*Primary Examiner* — Charles Bushey
(74) *Attorney, Agent, or Firm* — Harness, Dickey & Pierce, P.L.C.; Michael E. Hilton

(57) ABSTRACT

An apparatus constructed in a simple structure and capable of generating fine air bubbles and includes an apparatus body having a circular column-like internal space defined by a cylindrical inner surface and circular inner surfaces. At least one internal cylindrical member can be disposed within the internal space away from the cylindrical inner surface. A first fluid introduction section can inject a first fluid into a tubular space between the cylindrical inner surface and the internal cylindrical member toward a circumferential direction. A second fluid introduction section and a gas and liquid mixture discharge port can be disposed in the circular inner surfaces, respectively.

11 Claims, 18 Drawing Sheets

FOREIGN PATENT DOCUMENTS

| | | |
|---|---|---|
| JP | 2003-265939 | 9/2003 |
| JP | H15-265939 A | 9/2003 |
| JP | H15-275557 A | 9/2003 |
| JP | H17-034814 A | 2/2005 |
| JP | H17-218955 A | 8/2005 |
| JP | H17-245817 A | 9/2005 |
| JP | 2006-142251 | 6/2006 |
| JP | 2006-175358 | 7/2006 |
| WO | WO-2005/084718 A1 | 9/2005 |

* cited by examiner

Fig. 2
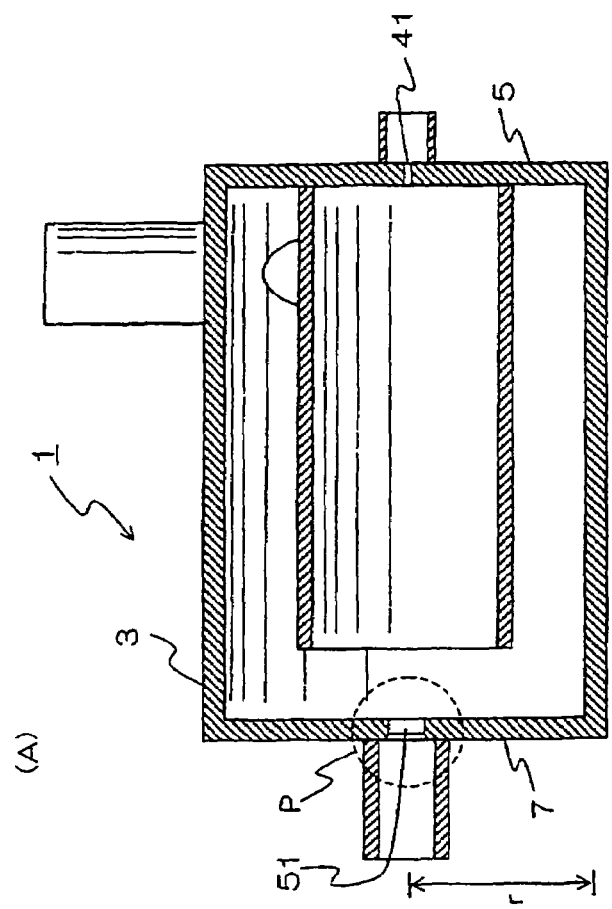
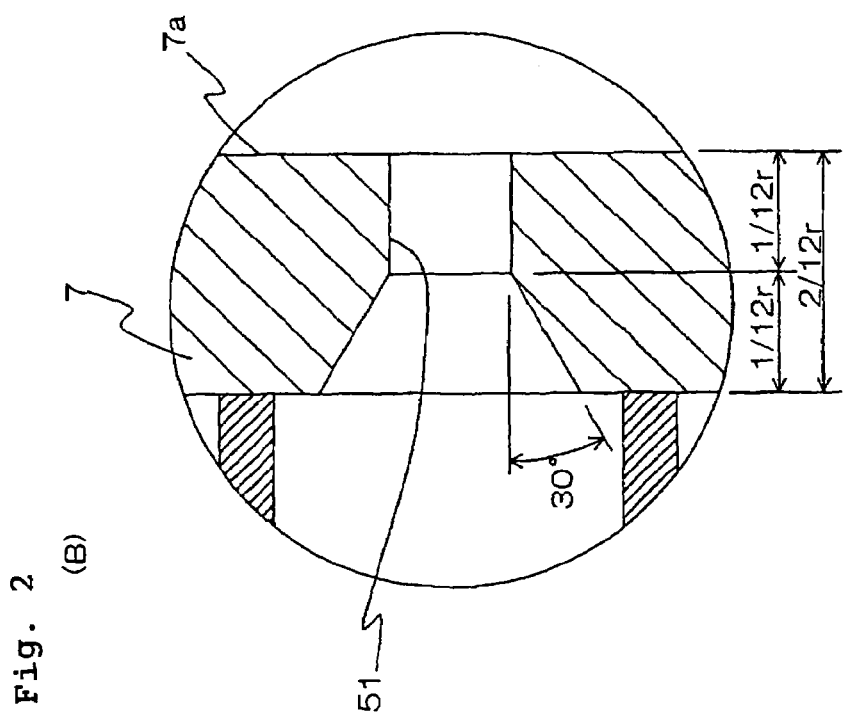

Fig. 5
(A) 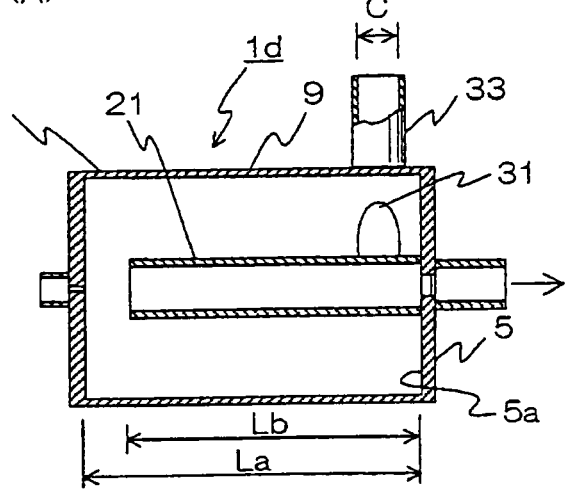
(B) 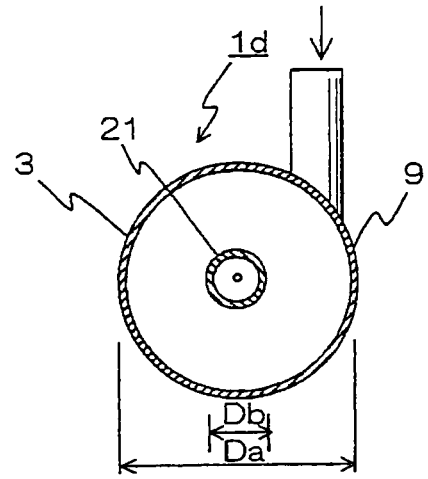
(C) 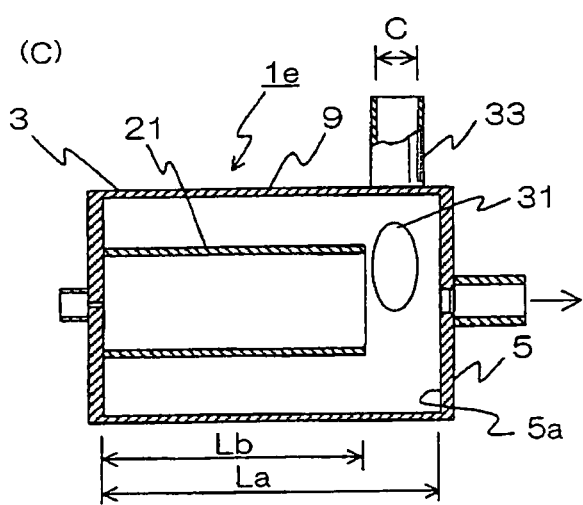
(D) 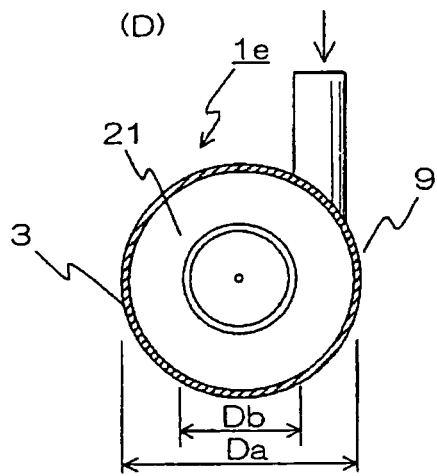
(E) 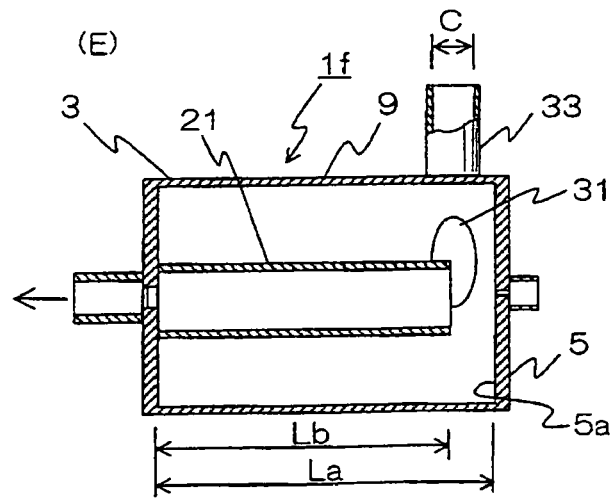
(F) 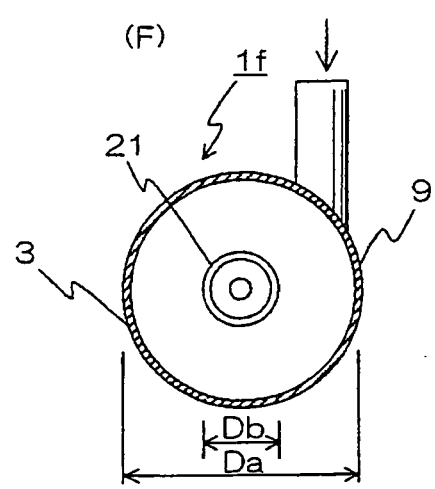

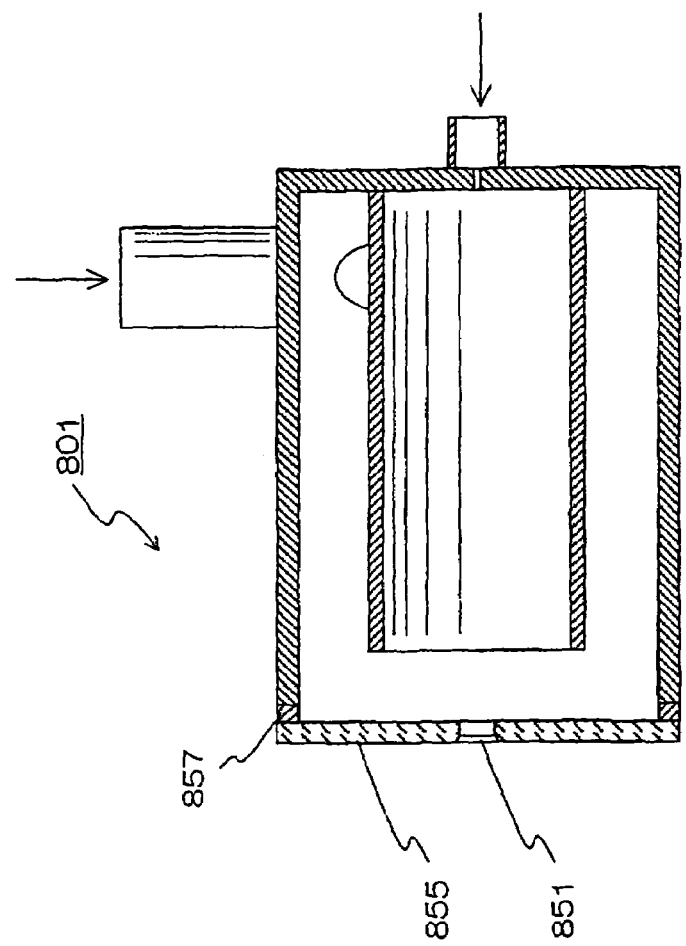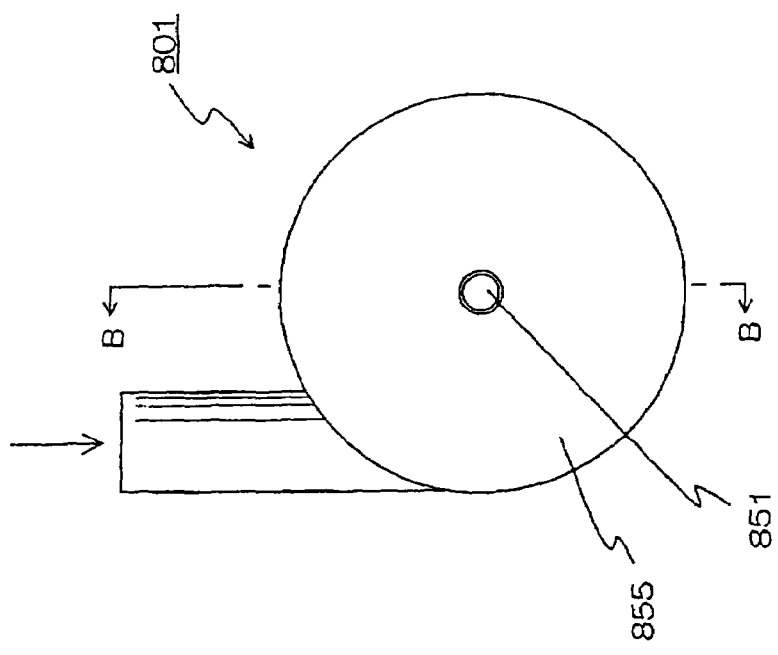
Fig. 17

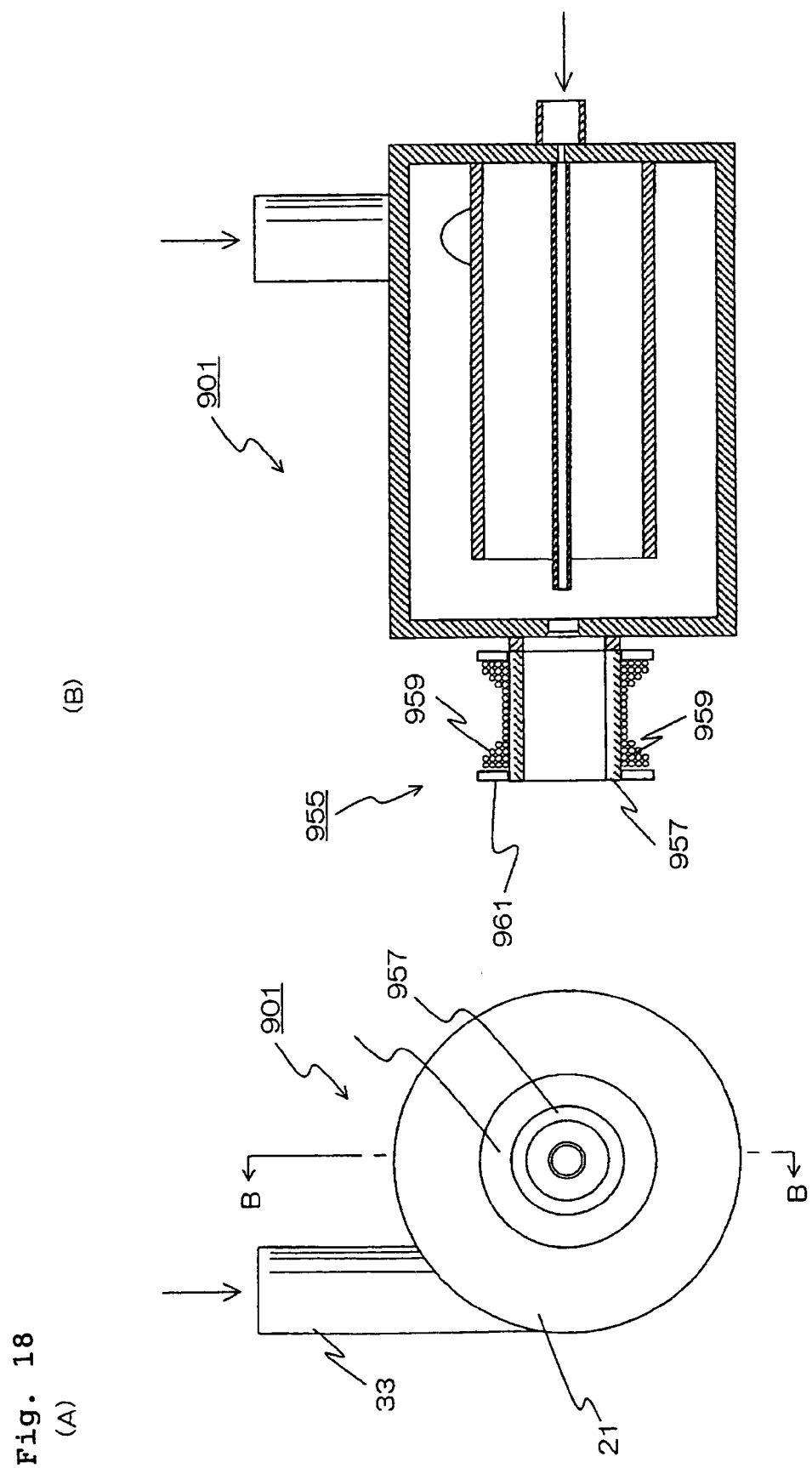

GAS AND LIQUID MIXTURE GENERATION APPARATUS

CROSS-REFERENCE TO RELATED APPLICATIONS

This application is a 371 U.S. National Stage of International Application No. PCT/JP2007/051895, filed Feb. 5, 2007. This application claims the benefit of Japanese Patent Application No. 2006-26451, filed Feb. 3, 2006, the disclosures of which are expressly incorporated herein by reference.

TECHNICAL FIELD

The present invention relates to a gas and liquid mixture generation apparatus and more particularly, to a gas and liquid mixture generation apparatus constructed in a simple structure and capable of generating fine air bubbles into a volume of liquid.

BACKGROUND ART

A gas and liquid mixture generation apparatus, such as an air bubble generation apparatus for generating fine air bubbles into a volume of liquid, has been conventionally expected to have a wide range of applications in different fields. Specifically, in one example, such an apparatus may be utilized to dissolve a volume of atmospheric air or other gases (such as oxygen, carbon dioxide, and nitrogen) in a volume of water (such as tap water, sea water, river water, lake water and purging water) or other liquid in an efficient manner for contribution to modifying liquid properties, purifying and enhancing water quality, and restoring aqueous environment. In addition to the above, there are some other possible applications in aquatic farming and breeding industry and general household use (such as in a bath room, kitchen and lavatory).

There have been suggested many different types of such air bubble generation apparatuses for generating fine air bubbles. Specifically, one such exemplary apparatus is a spinning type fine air bubble generation apparatus comprising: a container body having a space in a cylindrical or megaphone-like configuration having a bottom; a pressurized liquid introduction port opening at a part of a circumferential inner wall surface of the container body in a tangential direction relative to the inner wall; a gas introduction aperture opening at a bottom of the container body; and a spinning gas and liquid mixture delivery port opening at a tip of the container body (see Patent document 1).

In the above air bubble generation apparatus of the prior art, an operation thereof has been described as follows. Specifically, a volume of pressurized liquid is fed under a pressure through the pressurized liquid introduction port to cause a spinning flow inside the container body, which in turn produces a zone of a negative pressure around and along an axis of the cylindrical tube. Due to the presence of the negative pressure, a volume of gas is suctioned through the gas introduction port and as the gas flows past around and along the axis of the tube defining a lowest pressure zone, a narrow string-like spinning gas cavity is developed. The spinning gas cavity is torn apart by the pressurized liquid from the pressurized liquid introduction port, and in this event the fine air bubbles can be generated.

Further, a mist generation apparatus can be constructed by employing a similar structure to that of the air bubble generation apparatus described above. The mist generation apparatus may be applied diversely as described below. For example, the mist generation apparatus may be applied to desalination of the sea water and salt refining associated therewith. This is intended to separate the water content and the portion of salt and the like from each other by atomizing a volume of sea water into fine particles of mist and then heating the mist to allow the water content to evaporate instantly. The evaporated water content may be cooled to form a volume of plain water, while the salt can be produced at the same time.

The above apparatus may be similarly applicable in refining for fine powder of materials. This is intended to produce fine powder of materials by atomizing a volume of solvent mixed with an amount of metal, painting material, cosmetic material and the like to form fine particles of mist and drying thus finely atomized liquid drops instantly by bringing a hot air into contact with them.

In addition, the above apparatus may be similarly applicable to an environmental control for a greenhouse cultivation facility and the like. In this application, specifically the apparatus may serve for such operation as humidification, temperature control, water supply and so on for cultivated plants and the like.

Yet further, the above apparatus may be similarly applicable to a plant environmental sanitation control (such as, bacteria elimination, deodorization, odor elimination, bactericidal cleaning, temperature and moisture control, and measures against dust, in a space). This means that using the above apparatus in combination with a drug solution allows to accomplish the bacteria elimination, cleaning, odor elimination and temperature and moisture control in the space inside the target environment or facility (such as, inside a plant for food or for drugs and medicines, a medical facility, a distribution facility, a stable, a vehicle and the like).

The above mist generation apparatus may be also applicable to an environmental control for controlling a spatial environment (such as, a fairground and a working site). In this application, the apparatus is operable effectively for cooling down a high-temperature condition developed from a heat-island phenomenon, as measures to prevent heat stroke, and for managing a high temperature condition due to heat from displays. Specifically, in summer time, the control (cooling down, suppressing dusts) of the environment of the site or space containing a crowd of people gathering together may be provided by releasing finely atomized particles of mist into the space.

Further, the above apparatus may be used in disaster prevention and fire control facilities. In this application, the apparatus may be used as a dust suppressing device for preventing an accidental explosion of dust or as a device substituting for a sprinkler head (that can provide a comparative effect only with a small amount of water).

Yet further, the above apparatus may be applicable to health-care equipment, for example, to control a temperature or moisture and to provide a mist shower using a hot water.

In addition to those, the above apparatus is applicable to a recycling business from the viewpoint of the environmental issues. Specifically, the finely atomized particles of mist may be sprayed against a toxic emission gas discharging to the atmosphere from chemical plants, industrial waste incineration facilities, sludge incineration facility and the like so that the toxic gas can be adsorbed to a water content of the mist for collection and further handling.

[Patent document] International Patent Laid-open Publication No. WO00/69550, Booklet (FIG. 1)

DISCLOSURE OF THE INVENTION

Problems to be Solved by the Invention

However, the apparatuses according to the prior art have been suffered from such problems as stated below. Specifically, in order to generate fine air bubbles with an air bubble generation apparatus as an implementation of a gas and liquid mixture generation apparatus, it is required that a flow of liquid within the space of the container body should be stable. To this end, all of the conditions should be managed, including dimensions of respective components of the container body and a pressure under which the pressurized liquid is introduced as well as a back pressure within an aqueous environment in which the air bubble generation apparatus is placed. In this regard, with the air bubble generation apparatus of the prior art, which has the space inside the container body that is defined in the simple cylindrical or megaphone-like configuration, if any of the conditions is not satisfied, then the flow of the liquid inside the space would become unstable and could be ended up with no air bubbles or no fine air bubbles, if any, to be generated. As discussed above, for the air bubble generating apparatus of the prior art, a permissible range of the conditions for generating the fine air bubbles is narrowly limited and this problematically leads to the complexity in installation of the air bubble generation apparatus and/or in setting of the conditions.

Further, if the space inside the container body is defined in the simple cylindrical or megaphone-like configuration, then as the air bubble generation apparatus is sized larger, the fine air bubbles are proportionally difficult to generate. From this fact, a large sized apparatus with the structure inherent to the air bubble generation apparatus of the prior art could not be achieved. There is another problem of lower flexibility in designing the apparatus due to the simple configuration of the inside space, as the physical relationship between the pressurized liquid introduction port and the gas introduction port and the spinning gas and liquid mixture delivery port is fixed.

Further, those problems as noted above with the air bubble generation apparatus are similarly applied to the mist generation apparatus as another implementation of the gas and liquid mixture generation apparatus. To explain that, the flow of the gas inside the container must be stable in order to generate the finely atomized particles of mist. In addition, there has been some limitation in constructing the large sized mist generation apparatus based on the apparatus of the prior art.

Means for Solving the Problems

An object of the present invention is to provide a gas and liquid mixture generation apparatus that can solve the above problems and the object can be accomplished by a gas and liquid mixture generation apparatus employing such a configuration which comprises: an apparatus body having a circular column-like internal space defined by a cylindrical inner surface and circular inner surfaces; at least one internal cylindrical member disposed within the internal space away from the cylindrical inner surface; a first fluid introduction section for injecting a volume of first fluid into a tubular space between the cylindrical inner surface and the internal cylindrical member toward a circumferential direction; and a second fluid introduction section for introducing a volume of second fluid and a gas and liquid mixture discharge port, which are disposed in said circular inner surfaces, wherein either one of fluids selected from a group consisting of a liquid and a gas is introduced from the first fluid introduction section, and the other of the fluids is introduced from the second fluid introduction section.

Further, a gas and liquid mixture generation apparatus of the present invention may employ such a configuration in which the internal cylindrical member is concentric with a central axis of the circular column-like internal space and fixed to the circular inner surfaces.

Still further, a gas and liquid mixture generation apparatus of the present invention may employ such a configuration in which at least two internal cylindrical members having different diameters from each other are disposed in the apparatus, wherein the at least two internal cylindrical members are fixed to one and the other of the circular inner surfaces alternately in order corresponding to respective diameter sizes.

Yet further, a gas and liquid mixture generation apparatus of the present invention may employ such a configuration in which a spacing between the cylindrical inner surface and the internal cylindrical member and a spacing between respective internal cylindrical members are all equal.

Still further, a gas and liquid mixture generation apparatus of the present invention may employ such a configuration in which the spacing has a value determined by dividing a radius of the cylindrical inner surface by a multiple of 2 or a multiple of 3.

Yet further, a gas and liquid mixture generation apparatus of the present invention may employ such a configuration in which the second fluid introduction section is formed in a central region of the circular inner surface.

Still further, a gas and liquid mixture generation apparatus of the present invention may employ such a configuration in which the gas and liquid mixture discharge port is formed in a central region of the circular inner surface.

Yet further, a gas and liquid mixture generation apparatus of the present invention may employ such a configuration in which the second fluid introduction section and the gas and liquid mixture discharge port are formed respectively in different circular inner surfaces from each other.

Still further, a gas and liquid mixture generation apparatus of the present invention may employ such a configuration in which the gas and liquid mixture discharge port, also serving as the second fluid introduction section, is formed in one of the circular inner surfaces, wherein an end portion of a gas introduction pipe for introducing a gas is disposed in the proximity of the gas and liquid mixture discharge port.

Yet further, a gas and liquid mixture generation apparatus of the present invention may employ such a configuration in which the gas and liquid mixture discharge port comprises a combination of a circular column-like aperture formed in the circular inner surface side of the apparatus body with a circular truncated cone-like opening expanding toward an external side of the apparatus body.

Still further, a gas and liquid mixture generation apparatus of the present invention may employ such a configuration in which the apparatus further comprises a tubular gas and liquid mixture discharge pipe disposed around said gas and liquid mixture discharge port outside of the apparatus body.

Yet further, a gas and liquid mixture generation apparatus may employ such a configuration in which the first fluid introduction section is disposed in either one of the cylindrical inner surface or the circular inner surface.

Still further, a gas and liquid mixture generation apparatus of the present invention may employ such a configuration in which the first fluid introduction section has a circular cross section, whose diameter is equal to a spacing between the cylindrical inner surface and the internal cylindrical member.

Yet further, a gas and liquid mixture generation apparatus of the present invention may employ such a configuration in which the apparatus further comprises a tubular auxiliary pipe extending from the second fluid introduction section to the proximity of the gas and liquid mixture discharge port.

Still further, a gas and liquid mixture generation apparatus of the present invention may employ such a configuration in which an ultrasonic vibrator is disposed in the gas and liquid mixture discharge pipe.

Yet further, a gas and liquid mixture generation apparatus of the present invention may employ such a configuration in which an ultrasonic vibrator is disposed at the periphery of the gas and liquid mixture discharge port.

Still further, a gas and liquid mixture generation apparatus of the present invention may employ such a configuration in which an end wall in which the gas and liquid mixture discharge port is formed is constructed with an ultrasonic vibrator.

Yet further, a gas and liquid mixture generation apparatus of the present invention may employ such a configuration in which the gas and liquid mixture discharge pipe is constructed with an ultrasonic vibrator, wherein the ultrasonic vibrator comprises a tubular member made of metallic magnetic body and an electrically conductive coil wound around a surface of the tubular member.

Still further, a gas and liquid mixture generation apparatus of the present invention may employ such a configuration in which the ultrasonic vibrator is mounted on the apparatus body via a buffer member.

Advantages Of The Invention

Since the gas and liquid mixture generation apparatus of the present invention employs a multiple pipe structure, therefore a stable spinning energy can be obtained between the cylindrical inner surface of the apparatus body and the internal cylindrical member, so that fine air bubbles or fine particles of mist can be generated stably even if a pressure or a flow rate of the liquid or the gas to be introduced is low. In addition to that, the design by the present invention allows for the construction of an air bubble generation apparatus (10-300 litter/min) and/or a mist generation apparatus as an implementation of a gas and liquid mixture generation apparatus that can be sized diversely ranging from small to large sizes. Furthermore, since the air bubble generation apparatus has a structure that allows the gas to be suctioned through the spinning motion of the liquid according to the present invention, any complicated mechanism or the like components for introducing the gas can be eliminated. This may similarly apply to the mist generation apparatus having a structure that allows the liquid to be suctioned through the spinning motion of the gas. Further advantageously, since the wide permissible range of condition is allowed for generating the fine air bubbles or the fine particles of mist, such air bubbles or fine particles of mist can be well generated, even if the broad tolerance should be inherent to the specific material of the component. This supports a feasibility of the mass-production.

BRIEF DESCRIPTION OF THE DRAWINGS

FIG. 1 shows a gas and liquid mixture generation apparatus (an air bubble generation apparatus, a mist generation apparatus) according to a first embodiment of the present invention, wherein FIG. 1(A) is a top view, FIG. 1(B) is a sectional view taken along the B-B line of FIG. 1(A), FIG. 1(C) is a left-side elevational view and FIG. 1(D) is a right-side elevational view, respectively, of the apparatus;

FIG. 2(A) shows a sectional view of a gas and liquid mixture generation apparatus (an air bubble generation apparatus, a mist generation apparatus) and FIG. 2(B) is an enlarged view of a region P in FIG. 2(A), illustrating a gas and liquid mixture discharge port;

FIG. 3 is a diagram illustrating a principle of operation of the present invention, wherein FIG. 3(A) is a sectional view taken along the A-A line of FIG. 3(B) and FIG. 3(B) is a sectional view taken along B-B line of FIG. 3(A);

FIG. 5 is a sectional view illustrating a relationship between a ratio of a side wall diameter to an internal cylindrical member diameter, Db/Da, and air bubble (mist) generation property, wherein FIGS. 5(A) and (B) show a longitudinal sectional view and a cross sectional view when the Db/Da=1/4, FIGS. 5(C) and (D) shows longitudinal and cross sectional views when the internal cylindrical member is fixed to an end wall in the left-hand side in the illustration and the Db/Da=1/2, and FIGS. 5(E) and (F) show longitudinal and cross sectional views when the Db/Da=1/3, respectively, of the apparatus;

FIG. 6 is a diagram for illustrating a relationship between a change in diameter of an internal cylindrical member and a gas and liquid mixture discharge direction, wherein FIG. 6(A) is a longitudinal sectional view and FIG. 6(B) is a cross sectional view, respectively, of the apparatus;

FIG. 7 is a diagram for illustrating a relationship between a change in diameter of an internal cylindrical member and a gas and liquid mixture discharge direction for a case of a double internal cylindrical member, wherein FIG. 7(A) is a longitudinal sectional view and FIG. 7(B) is a cross sectional view, respectively, of the apparatus;

FIG. 8 is a diagram for illustrating a relationship between a change in diameter of an internal cylindrical member and a gas and liquid mixture discharge direction for a case of a triple internal cylindrical member, wherein FIG. 8(A) is a longitudinal sectional view and FIG. 8(B) is a cross sectional view, respectively, of the apparatus;

FIG. 9 is a diagram showing a variation of a gas and liquid mixture generation apparatus (an air bubble generation apparatus, a mist generation apparatus) as disclosed in FIG. 1 with a location of a liquid injection section that has been modified from that in FIG. 1, wherein FIG. 9(A) is a longitudinal sectional view and FIG. 9(B) is a cross sectional view, respectively, of the apparatus;

FIG. 10 is a diagram showing a gas and liquid mixture generation apparatus (an air bubble generation apparatus, a mist generation apparatus) according to a second embodiment of the present invention, wherein FIG. 10(A) is a longitudinal sectional view and FIG. 10(B) is a cross sectional view, respectively, of the apparatus;

FIG. 11 is a diagram showing a gas and liquid mixture generation apparatus (an air bubble generation apparatus, a mist generation apparatus) according to a third embodiment of the present invention, wherein FIG. 11(A) is a longitudinal sectional view and FIG. 11(B) is a cross sectional view, respectively, of the apparatus;

FIG. 12 is a diagram showing a gas and liquid mixture generation apparatus (an air bubble generation apparatus, a mist generation apparatus) according to a fourth embodiment of the present invention, wherein FIG. 12(A) is a longitudinal sectional view and FIG. 12(B) is a cross sectional view, respectively, of the apparatus;

FIG. 13 is a diagram showing a gas and liquid mixture generation apparatus (an air bubble generation apparatus, a mist generation apparatus) according to a fifth embodiment of the present invention, wherein FIG. 13(A) is a sectional view taken along the A-A line of FIG. 13(B) and FIG. 13(B) is a sectional view taken along the B-B line of FIG. 13(A), respectively, of the apparatus;

FIG. 14 is a diagram showing a gas and liquid mixture generation apparatus (an air bubble generation apparatus, a mist generation apparatus) according to a sixth embodiment of the present invention, wherein FIG. 14(A) is a sectional view taken along the A-A line of FIG. 14(B) and FIG. 14(B) is a sectional view taken along the B-B line of FIG. 14(A), respectively, of the apparatus;

FIG. 15 is a diagram showing a gas and liquid mixture generation apparatus (an air bubble generation apparatus, a mist generation apparatus) according to a seventh embodiment of the present invention, wherein FIG. 15(A) is a left-side elevational view and FIG. 15(B) is a front view, respectively, of the apparatus;

FIG. 16 is a diagram showing a gas and liquid mixture generation apparatus (an air bubble generation apparatus, a mist generation apparatus) according to an eighth embodiment of the present invention, wherein FIG. 16(A) is a left-side elevational view and FIG. 16(B) is a sectional view taken along the B-B line of FIG. 16(A), respectively, of the apparatus;

FIG. 17 is a diagram showing a gas and liquid mixture generation apparatus (an air bubble generation apparatus, a mist generation apparatus) according to a ninth embodiment of the present invention, wherein FIG. 17(A) is a left-side elevational view and FIG. 17(B) is a sectional view taken along the B-B line of FIG. 17(A), respectively, of the apparatus; and FIG. 18 is a diagram showing a gas and liquid mixture generation apparatus (an air bubble generation apparatus, a mist generation apparatus) according to a tenth embodiment of the present invention, wherein FIG. 18(A) is a left-side elevational view and FIG. 18(B) is a sectional view taken along the B-B line of FIG. 8(A), respectively, of the apparatus.

EXPLANATION OF THE REFERENCE NUMERALS

Figure 1:
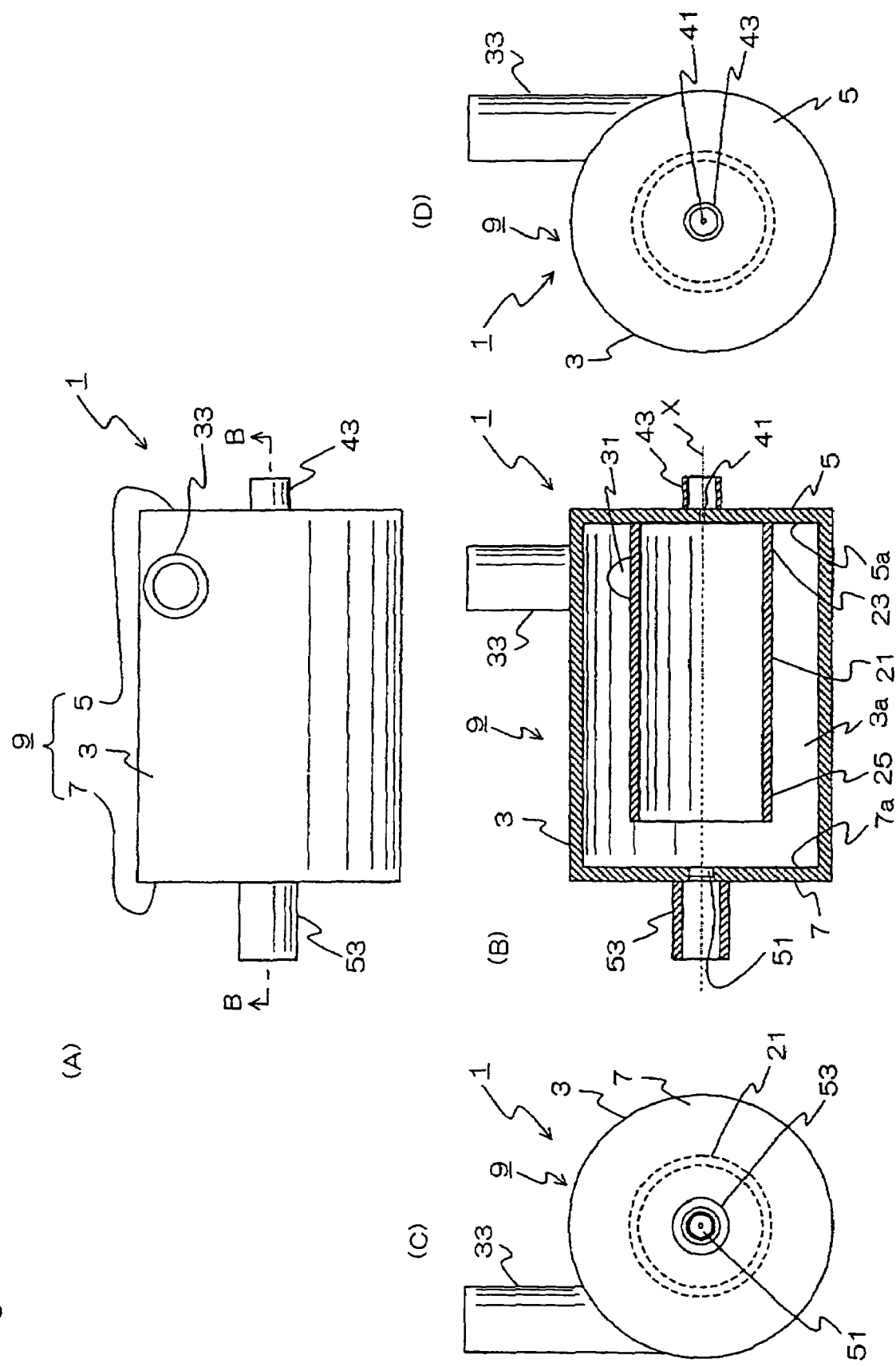

1 Gas and liquid mixture generation apparatus (an air bubble generation apparatus, a mist generation apparatus)
3 Side wall
5, 7 End wall
5a, 7a Circular inner wall
9 Apparatus body
21 Internal cylindrical member
31 First fluid introduction section (liquid injection section, gas injection section)
41 Second fluid introduction section (gas introduction section, liquid introduction section)
51 Gas and liquid mixture discharge port
53 Gas and liquid mixture discharge pipe
X Central axis

PREFERRED EMBODIMENT OF THE INVENTION

Overview

With reference to the attached drawings, a gas and liquid mixture generation apparatus according to one embodiment of the present invention will now be described. First of all, an air bubble generation apparatus taken as an implementation of the gas and liquid mixture generation apparatus will be described.

An air bubble generation apparatus according to the present invention comprises an apparatus body having a circular column-like internal space defined by a cylindrical inner surface and circular inner surfaces; at least one internal cylindrical member disposed within the internal space away from the cylindrical inner surface; a first fluid introduction section (hereinafter, referred to as "a liquid injection section") for injecting a liquid or a first fluid into a tubular space between the cylindrical inner surface and the internal cylindrical member toward a circumferential direction; and a second fluid introduction section (hereinafter, referred to as "a gas introduction port") for introducing a gas or a second fluid along with a gas and liquid mixture discharge port, which are disposed in the circular inner surfaces. Embodiments according to the present invention will now be described in detail with reference to the attached drawings.

First Embodiment

First referring to FIGS. 1-9, a first embodiment of the present invention and variations thereof will be described in detail.

Apparatus Body

An air bubble generation apparatus 1 according to this embodiment comprises an apparatus body 9 having a circular column-like internal space defined by a side wall 3 having a cylindrical inner surface 3a and end walls 5 and 7 having circular inner surfaces 5a and 7a, respectively. Ends of the apparatus body 9 are substantially closed by the circular end walls 5 and 7, respectively. However, the circular inner surfaces 5a and 7a is provided with a gas introduction port 41 and a gas and liquid mixture discharge port 51, respectively. Those gas introduction port 41 and gas and liquid mixture discharge port 51 will be described later in detail.

Although the apparatus body 9 according to the illustrated embodiment comprises a cylindrical member having a bottom, the present invention is not limited to that but it may be have a cubic or other contour as far as the substantially circular column-like internal space could be simply provided. In addition, each of the end walls 5, 7 would not be necessarily circular, but a rectangular or other shapes of the end wall 5, 7 may be used corresponding to the contour of the apparatus body 9.

Further, although the apparatus body 9 according to the illustrated embodiment comprises the cylindrical side wall 3 and respective end walls 5 and 7, which are constructed integrally, the present invention is not limited to that, those components may be produced as separate members and then connected to each other. In an alternative way, initially the side wall 3 and one of the end walls 5 may be constructed integrally, to which the other of the end walls 7 may be connected later.

There may be various types of materials available for constructing the apparatus body 9 and any materials having a property that would not be modified due to the contact with the liquid may be used, including acrylic resins and metals, for example. Specifically, a transparent acrylic resin used for constructing the apparatus body 9 would permit the observation of air bubbles being generated inside the transparent apparatus body 9. On the other hand, if the apparatus body 9 is constructed with a metal, and additionally provided with a transparent window at a predetermined location, then the inside thereof may be observed, similarly to the apparatus body 9 constructed with the acrylic resin.

Further, as for the strength of the apparatus body 9, the body 9 should be sufficiently durable against a pressure of a liquid to be injected from a liquid injection section 31, which will be described later, and so thickness of each of the side wall 3 and end walls 5 and 7 of the apparatus body 9 may be specified based on the pressure. It is to be noted that although the apparatus body 9 according to the present invention has substantially same thickness of each component as shown in FIG. 1(B), the present invention is not limited to that, but the thickness of the side wall 3 may be thinner than that of the end walls 5 and 7 or vice versa. Further, the thickness of one end wall 5, 7 may be different from the other end wall 5, 7. It is to be noted that although the expression, a "circular column-like" internal space, has been chosen in association with the apparatus body 9, this may not mean a circular column in strict sense but is intended to include any configurations that can be substantially identified as a circular column.

To describe a size of the apparatus body 9 of the illustrated embodiment only by way of example, an outer diameter of the side wall 3 is about 56 mm and a diameter of the cylindrical inner surface 3a may be around 50 mm. Correspondingly, the thickness of the side wall 3 is about 3 mm and the end wall 5, 7 is also configured to be about 3 mm thick. In addition, a length of the contour of the apparatus body 9 is about 81 mm and a length of the internal space is about 75 mm. However, the dimensions as listed above are illustrative only, but not restrictive.

Internal Cylindrical Member

An internal cylindrical member 21 will now be described. The internal cylindrical member 21 is disposed to be substantially concentric with the circular column-like internal space. In other words, viewing the internal space of the apparatus body 9 as a circular column, a position of a central axis, X, passing through a center of a circular cross section of the circular column (see FIG. 1(B)) is identical with a position of a central axis of the internal cylindrical member 21. As it is, one end 23 of the internal cylindrical member 21 is fixed to the inner wall surface 5a of one end wall 5 and the other and 25 of the internal cylindrical member 21 extends toward the other end wall 7. However, the other end 25 of the internal cylindrical member 21 is not reaching to the other end wall 7. Consequently, a predetermined gap is provided between the circular inner surface 7a of the end wall 7 and the other end 25 of the internal cylindrical member 21.

Although the internal cylindrical member 21 according to the illustrated embodiment is constructed with a separate member from the apparatus body 9 and two components are then coupled to each other, the present invention is not limited to that but the internal cylindrical member 21 may be constructed integrally with the apparatus body 9. It may be made of the same material as or a different material from the apparatus body 9. It is to be noted that although the term "cylindrical" is used to express the internal cylindrical member 21, needless to say, this may not mean a cylinder in strict sense but is intended to include any configurations that can be substantially identified as a cylinder.

As explained above, by arranging the internal cylindrical member 21 in the apparatus body 9 to be concentric therewith, a tubular space is defined between the cylindrical inner surface 3a of the apparatus body 9 and an outer circumferential surface of the internal cylindrical member 21 and a circular column-like space is defined inside the internal cylindrical member 21. The tubular space and the circular column-like space communicate with each other in the proximity of the circular inner surface 7a of the end wall 7.

To describe a size of the internal cylindrical member 21 only by way of example, an outer diameter is about 30 mm and an inner diameter is about 26 mm. Correspondingly, a thickness of the internal cylindrical inner wall 21 is about 2 mm and a length of the internal cylindrical member 21 is about 65 mm. Correspondingly, the other end 25 of the internal cylindrical member 21 is spaced away from the other end wall 7 by about 10 mm. However, those dimensions are illustrative only but not restrictive.

Liquid Injection Section

A liquid injection section 31 will now be described. The liquid injection section 31 serves to inject a pressurized liquid into the internal space of the apparatus body 9. The liquid injection section 31 according to the present invention is an aperture formed at a predetermined location in the side wall 3 of the apparatus body 9. This aperture is fitted with a liquid injection pipe 33, which may be connected with a pressurized liquid source (for example, a pressure pump), though not shown.

The location of the liquid injection section 31 is arranged so that when a volume of liquid is injected into the tubular space between the side wall 3 of the apparatus body 9 and the internal cylindrical member 21, mono-directional stream of liquid can be created along a circumferential direction of the tubular space. In the illustrated embodiment, the liquid inject section 31 is oriented along a tangential direction with respect to the side wall 3 of the apparatus body 9 and the internal cylindrical member 21. It is to be noticed that this is not limited strictly to the tangential direction but a certain range of direction may be acceptable so long as the liquid flows to rotate along a fixed circumferential direction inside the apparatus body 9. In addition, the location of the liquid injection section 31 and the liquid injection pipe 33, as the air bubble generation apparatus 1 is viewed from the side, is offset to the left with respect to the circular cross section, as shown in FIG. 1(C), and this is because the liquid injection section 31 is designed such that the center of the liquid injection section 31 is positioned in the center of the tubular space. However, the present invention is not limited to that, but what is necessary is that the flow of liquid from the liquid injection section 31 may be offset to either sides as viewed from the central axis X of the apparatus body 9.

Further, although an inner diameter of the liquid injection section 31 and the liquid injection pipe 33 may be differently designed, in the illustrated embodiment, they have a diameter substantially equal to a gap between the cylindrical inner surface 3a of the side wall 3 and the outer circumferential surface of the internal cylindrical member 21. This is because the above size is necessary and sufficient to impart a circumferentially directed stream to the liquid inside the apparatus body 9. However, it is not essential for the diameter to conform exactly to the gap, but a smaller or larger diameter than the gap may be used.

Although the liquid injection pipe 33 of the present invention, which is a tubular member manufactured separately from the apparatus body 9, is connected to the side wall 3 of the apparatus body 9, the present invention is not limited to that but it may be constructed integrally with the apparatus body 9. Further, the material of the liquid injection pipe 33 may be the same material as or a different material from that of the apparatus body 9. An inner diameter size of the liquid injection section 31 is designed to be about 10 mm in one example. However, that is only by way of example but not restrictive.

Gas Introduction Port

The gas introduction port 41 will now be described. The gas introduction port 41 is formed in the circular inner surface 5a of one of the end walls 5 of the apparatus body 9. In the illustrated embodiment, it is disposed in a central region of the circular inner surface 5a. The gas introduction port 41, which is disposed to be concentric with the central axis X of the apparatus body 9, extends from the circular inner surface 5a through the end wall 5 to provide a communication between the internal space of the apparatus body 9 and the outside thereof. However, the gas introduction port 41 is not necessarily formed to be concentric with the central axis X of the apparatus body 9, but may be oriented with a predetermined angle with respect to the central axis X. It is to be appreciated that although a diameter of the gas introduction port 41 of the present embodiment is designed to be around 1 mm, it may have a reduced diameter than that or may have a diameter over 1 mm, as desired.

In addition, a tubular adaptor 43 having a predetermined length is disposed in the exterior of the one end wall 5 around the gas and liquid mixture introduction port 41. This tubular adaptor 43 is connected with a piping (omitted in the illustration) for introducing a volume of gas. However, if the air bubble generation apparatus 1 is used in a gaseous atmosphere, both of the tubular adaptor 43 and the piping are not required.

Gas and Liquid Mixture Discharge Port

Turning now to FIG. 2, the gas and liquid mixture discharge port 51 will be described. FIG. 2(A) is a sectional view showing generally the air bubble generation apparatus 1, while FIG. 2(B) is an enlarged view of a region P in FIG. 2(A). The gas and liquid mixture discharge port 51 is formed in a central region of the circular inner surface 7a of the other of end walls 7 of the apparatus body 9 and provides a communication between the interior of the apparatus body 9 and the outside thereof. A specific configuration of the gas and liquid mixture discharge port 51 comprises a circular column-like aperture having a constant diameter extending from the circular inner surface 7a of the other end wall 7 over a predetermined range (e.g., up to one-half of the thickness of the end wall 7), from which a circular truncated cone-like opening extends to expand outward in a truncated conical configuration, as shown in FIG. 2(B). The truncated cone is configured to have an angle of inclination around 30 degrees. An inner diameter of the gas and liquid mixture discharge port 51 is designed to be around 5 mm in the internal space side. However, those dimensions are presented by way of example only but not intended to limit the present invention. For example, the size of the port may vary depending on the diameter of the side wall 3 of the apparatus body 9 and the illustrated embodiment employs the size about 1/12 of the diameter. In other ways, the port may be sized to be about one half of the inner diameter of liquid introduction pipe 33.

A gas and liquid mixture discharge pipe 53 having a predetermined length is disposed in the exterior of the end wall 7 circumferentially around the gas and liquid mixture discharge port 51. The gas and liquid mixture discharge pipe 53 is mounted in order to further refine the air bubbles, as will be described below. However, it is to be appreciated that the gas and liquid mixture discharge pipe 53 is not essential, as the fine air bubbles can be generated without gas and liquid mixture discharge pipe 53.

Operation

Figure 3:
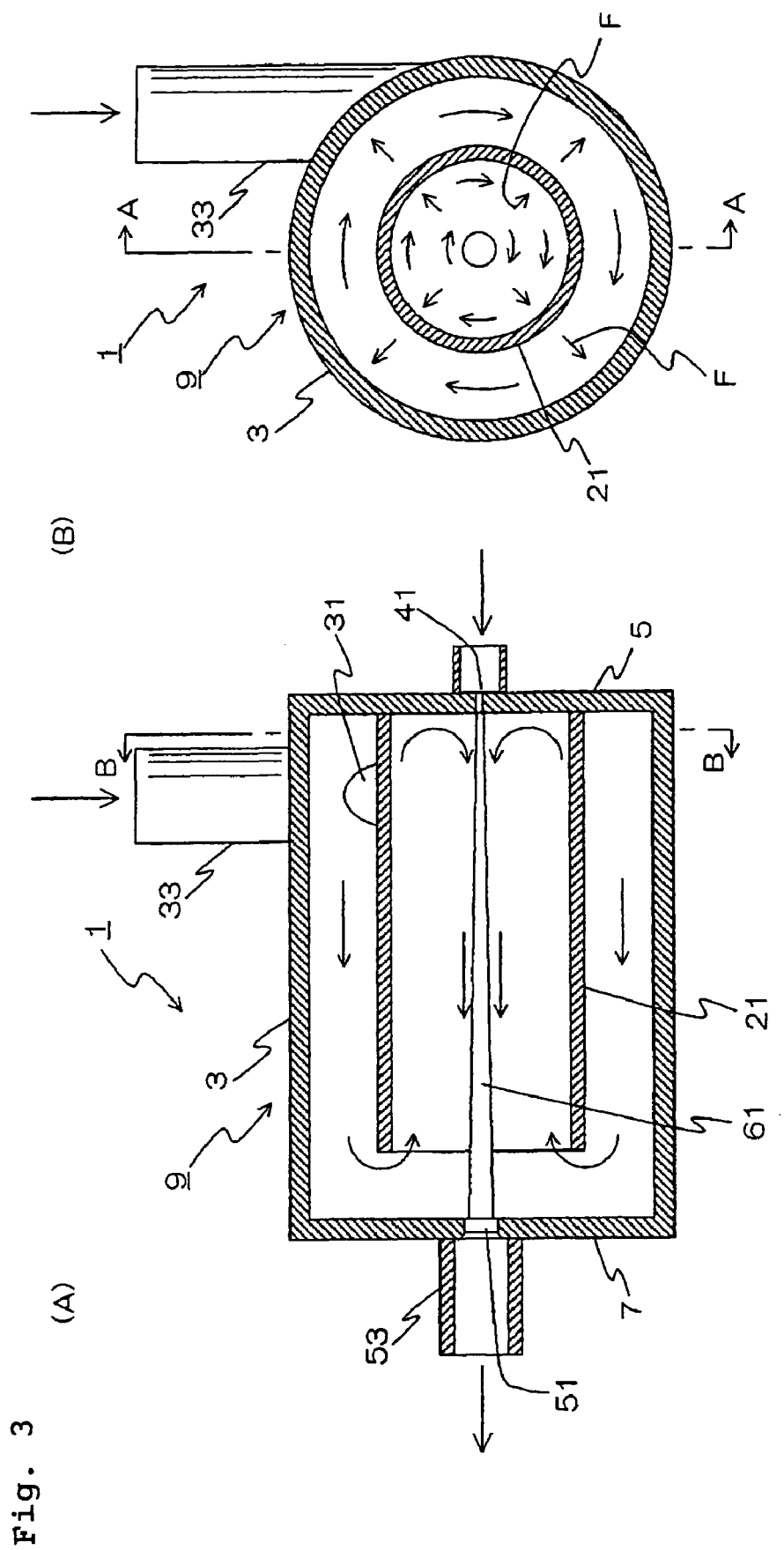

An operation specific to the air bubble generation apparatus 1 according to the present embodiment will now be described with reference to FIG. 3. Initially, a predetermined volume of liquid is injected from the liquid injection section 31 via a liquid injection pipe 33. Once the internal space of the apparatus body 9 has been filled with the liquid, a volume of liquid within the tubular space of the internal space makes a spinning motion in a clockwise direction viewed from the one end wall 5 side, as shown in FIG. 3(B). At that time, a centrifugal force F from the spinning motion is exerted on the liquid. The liquid, as it is spinning, flows along the direction toward the other end wall 7. The volume of liquid that has flown to the region adjacent to the other end wall 7 then flows further into the inside of the internal cylindrical member 21, while continuously making a spinning motion. The centrifugal force F from the spinning motion is similarly exerted on the liquid that has flown into the inside of the internal cylindrical member 21, and the liquid is forced along the inner circumferential wall of the internal cylindrical member 21 back into the region adjacent to the one end wall 5. Subsequently, the volume of liquid that has reached the proximity of the one end wall 5 now flows toward the other end wall 7 along a central region of the internal cylindrical member 21. At that time, the liquid, which is under the centrifugal force F from the spinning motion, produces a condition with relatively reduced pressure in the central region of the internal cylindrical member, and if there is relatively high pressure existing externally, then a volume of gas will be introduced from the gas introduction port 41. Thus introduced volume of gas forms a vortex flow of gas 61 within the volume of liquid and then, with the aid of the flow of liquid in the spinning motion directed to the other end wall 7, reaches the region adjacent to the other end wall 7.

At that time, the liquid and the vortex flow of gas 61 become suddenly unstable at the gas and liquid mixture discharge port 51 and the vortex flow of gas 61 is forced to be cut apart thereby generating a large amount of fine air bubbles. In addition, the air bubbles in the volume of gas and liquid mixture are cut and refined into much finer air bubbles in the gas and liquid mixture discharge pipe 53. Furthermore, as the volume of gas and liquid mixture exits the gas and liquid mixture discharge pipe 53 to the outside, the air bubbles are further cut and refined due to a differential mass relative to the external environment (such as, atmosphere, or liquid) and resultantly a large amount of ultra-fine air bubbles can be generated.

Figure 4:
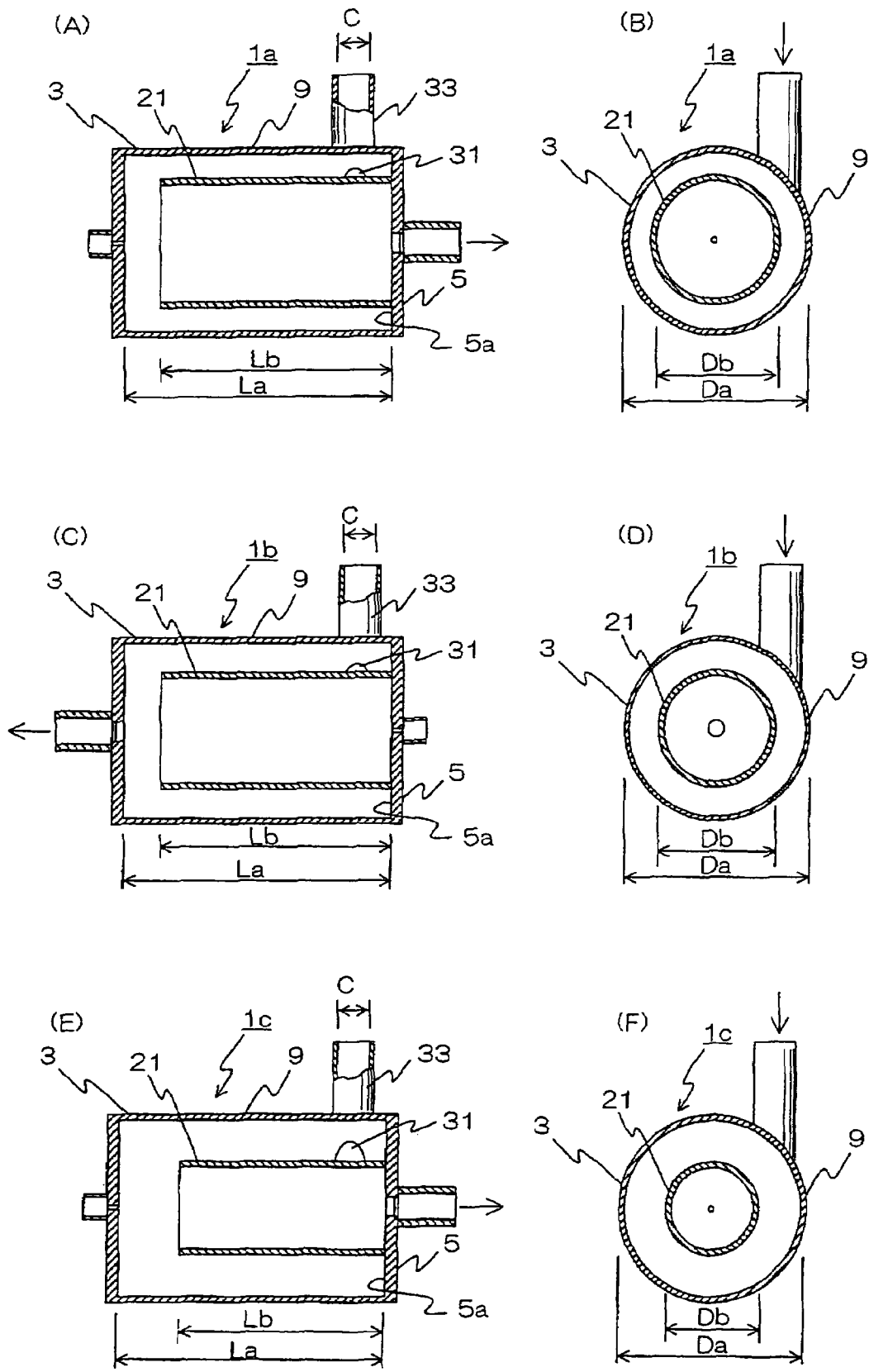
FIG. 4 is a sectional view of the apparatus illustrating a relationship between a ratio of a side wall diameter to an internal cylindrical member diameter, Db/Da, and an air bubble (mist) generation property, wherein FIGS. 4(A) and (B) show a longitudinal sectional view and a cross sectional view when the Db/Da=3/4, FIGS. 4(C) and (D) show longitudinal and cross sectional views when the Db/Da=2/3, and FIGS. 4(E) and (F) show longitudinal and cross sectional views when the Db/Da=1/2, respectively, of the apparatus.

Variation in Air Bubble Generation Property Depending on Dimensions of Respective Components Turning now to FIGS. 4 and 5, a variation in air bubble generation property resulting from varying dimensions of respective components of the air bubble generation apparatus will be described. The applicant of the present invention has constructed the air bubble generation apparatus 1 with different dimensions of respective components and finally found a specific condition that allows the air bubbles to be generated appropriately.

First looking into an air bubble generation apparatus 1a as shown in FIGS. 4(A) and (B), the length of the internal space of the apparatus body 9 is designated as La, the length of the internal cylindrical member 21 as Lb, the diameter of the apparatus body 9 as Da and the diameter of the internal cylindrical member 21 as Db, respectively. In addition, the inner diameter of the liquid injection section 31 is designated as C. In this regard, the diameter Da of the apparatus body 9 and the diameter Db of the internal cylindrical member 21 do not necessarily conform to their respective inner or outer diameter, as the measurement took a middle point of the thickness of the component as a reference. However, since the thickness of the side wall 3 of the apparatus body 9 as well as the thickness of the internal cylindrical member 21 is thinner relative to the diameter of respective components, they would not affect significantly to the variation of the property of the air bubble generation apparatus 1a.

For the specific example as illustrated, the experimental result on a ratio of diameter was obtained, indicating that within a range of Db/Da=0.70-0.80, specifically 0.75(=3/4) was optimal. The experimental result on a ratio of length was also obtained, indicating that within a range of Lb/La=0.80-

0.90, specifically 0.875 was optimal. It is to be noted that the liquid injection section 31 was disposed on the circular inner surface 5a side defined in the right hand side in the illustration, and its inner diameter was set to be $C=\frac{1}{8}\cdot Da$. Further, the internal cylindrical member 21 was fixed to the circular inner surface 5a in the right hand side in the illustration. In this specific example, a volume of gas and liquid mixture containing air bubbles would be discharged from the right hand side in the illustration.

FIGS. 4(C) and (D) represent an exemplary air bubble generation apparatus 1b where the diameter Db of the internal cylindrical member 21 is reduced. For this specific example, the experimental result was obtained on the ratio of diameter, indicating that within a range of $Db/Da=0.56\text{-}0.83$, specifically $0.67(=\frac{2}{3})$ was optimal. The experimental result on the ratio of length was also obtained, indicating that within a range of $Lb/La=0.66\text{-}0.88$, specifically 0.833 was optimal. It is to be noted that the liquid injection section 31 was disposed on the circular inner surface 5a side, and its inner diameter was set to be $\frac{1}{6}\cdot Da$. Further, the internal cylindrical member 21 was fixed to the circular inner surface 5a in the right hand side in the illustration. In this specific example, a volume of gas and liquid mixture containing air bubbles would be discharged from the left hand side in the illustration.

FIGS. 4(E) and (F) represent an exemplary air bubble generation apparatus 1c where the diameter Db of the internal cylindrical member 21 is further reduced. For this specific example, the experimental result was obtained on the ratio of diameter, indicating that within a range of $Db/Da=0.40\text{-}0.55$, specifically $0.50(=\frac{2}{4})$ was optimal. The experimental result on the ratio of length was also obtained, indicating that within a range of $Lb/La=0.66\text{-}0.88$, specifically 0.75 was optimal. It is to be noted that the inner diameter of the liquid injection section 31 was set to be $\frac{1}{4}\cdot Da$. Further, the internal cylindrical member 21 was fixed to the circular inner surface 5a in the right hand side in the illustration. In this specific example, a volume of gas and liquid mixture containing air bubbles would be discharged from the right hand side in the illustration.

FIGS. 5(A) and (B) represent an exemplary air bubble generation apparatus 1d where the diameter Db of the internal cylindrical member 21 is still further reduced. For this specific example, the experimental result was obtained on the ratio of diameter, indicating that within a range of $Db/Da=0.22\text{-}0.28$, specifically $0.25(=\frac{1}{4})$ was optimal. The experimental result on the ratio of length was also obtained, indicating that within a range of $Lb/La=0.80\text{-}0.90$, specifically 0.875 was optimal. It is to be noted that the inner diameter of the liquid injection section 31 was set to be $\frac{1}{8}\cdot Da$. Further, the internal cylindrical member 21 was fixed to the circular inner surface 5a in the right hand side in the illustration. In this specific example, a volume of gas and liquid mixture containing air bubbles would be discharged from the right hand side in the illustration.

FIGS. 5(C) and (D) represent an exemplary air bubble generation apparatus 1e where the internal cylindrical member 21 is fixed to the circular inner surface 7a in the left hand side in the illustration. For this specific example, the experimental result was obtained on the ratio of diameter, indicating that within a range of $Db/Da=0.40\text{-}0.55$, specifically $0.50(=\frac{2}{4})$ was optimal. The experimental result on the ratio of length was also obtained, indicating that within a range of $Lb/La=0.80\text{-}0.90$, specifically 0.875 was optimal. It is to be noted that the inner diameter of the liquid injection section 31 was set to be $\frac{1}{8}\cdot Da$. In this specific example, a volume of gas and liquid mixture containing air bubbles would be discharged from the right hand side in the illustration.

FIGS. 5(E) and (F) represent an exemplary air bubble generation apparatus if where the diameter Db of the internal cylindrical member 21 is reduced relative to the specific example as shown in FIGS. 5(C) and (D). For this specific example, the experimental result was obtained on the ratio of diameter, indicating that within a range of $Db/Da=0.30\text{-}0.37$, specifically $0.33(=\frac{1}{3})$ was optimal. The experimental result on the ratio of length was also obtained, indicating that within a range of $Lb/La=0.66\text{-}0.88$, specifically 0.833 was optimal. It is to be noted that the inner diameter of the liquid injection section 31 was set to be $\frac{1}{6}\cdot Da$. In this specific example, a volume of gas and liquid mixture containing air bubbles would be discharged from the left hand side in the illustration.

As described above, it has been confirmed from the viewpoint focused on the ratio of diameter that the air bubbles can be generated appropriately when using the following diametric ratio: 2/3, 1/3, 1/6, 1/12, 1/24, 1/48 . . . and/or 3/4, 2/4, 1/4, 1/8, 1/16, 1/32, 1/64 . . . , for example.

Variation in discharge direction of a gas and liquid mixture Depending on Dimensions of Respective Components Now referring to FIGS. 6-8, variation in discharge direction of a gas and liquid mixture resulting from varying diameter of the internal cylindrical member 21 relative to a diameter of the internal space of the apparatus body 9 will be described.

Figure 6:
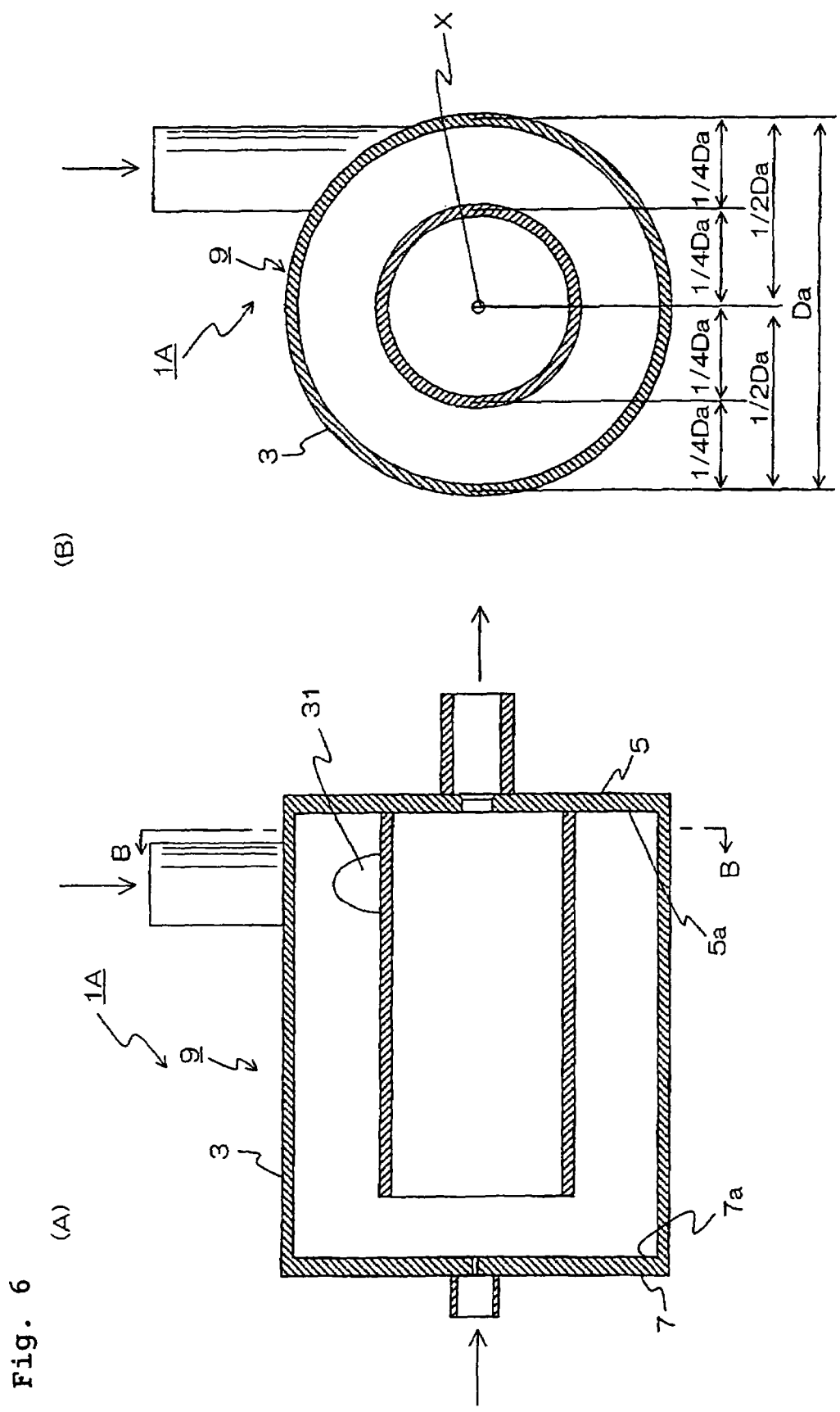

FIG. 6 shows a case where the liquid injection section 31 is disposed in the right hand side and also the internal cylindrical member 21 is fixed to the circular inner surface 5a in the right hand side in the illustration. In this specific example, the diameter of the apparatus body 9 is designated as Da, while the diameter of the internal cylindrical member 21 is defined to be $\frac{2}{4}Da$. Specifically, the distance between the side wall 3 of the apparatus body 9 and the internal cylindrical member 21 is $\frac{1}{4}Da$ and the distance from the internal cylindrical member 21 to the central axis X of the apparatus body 9 and the internal cylindrical member 21 is also $\frac{1}{4}Da$. It has been confirmed by the experiment that under such a condition, a volume of gas and liquid mixture is discharged from the right hand side in the illustration.

Figure 7:
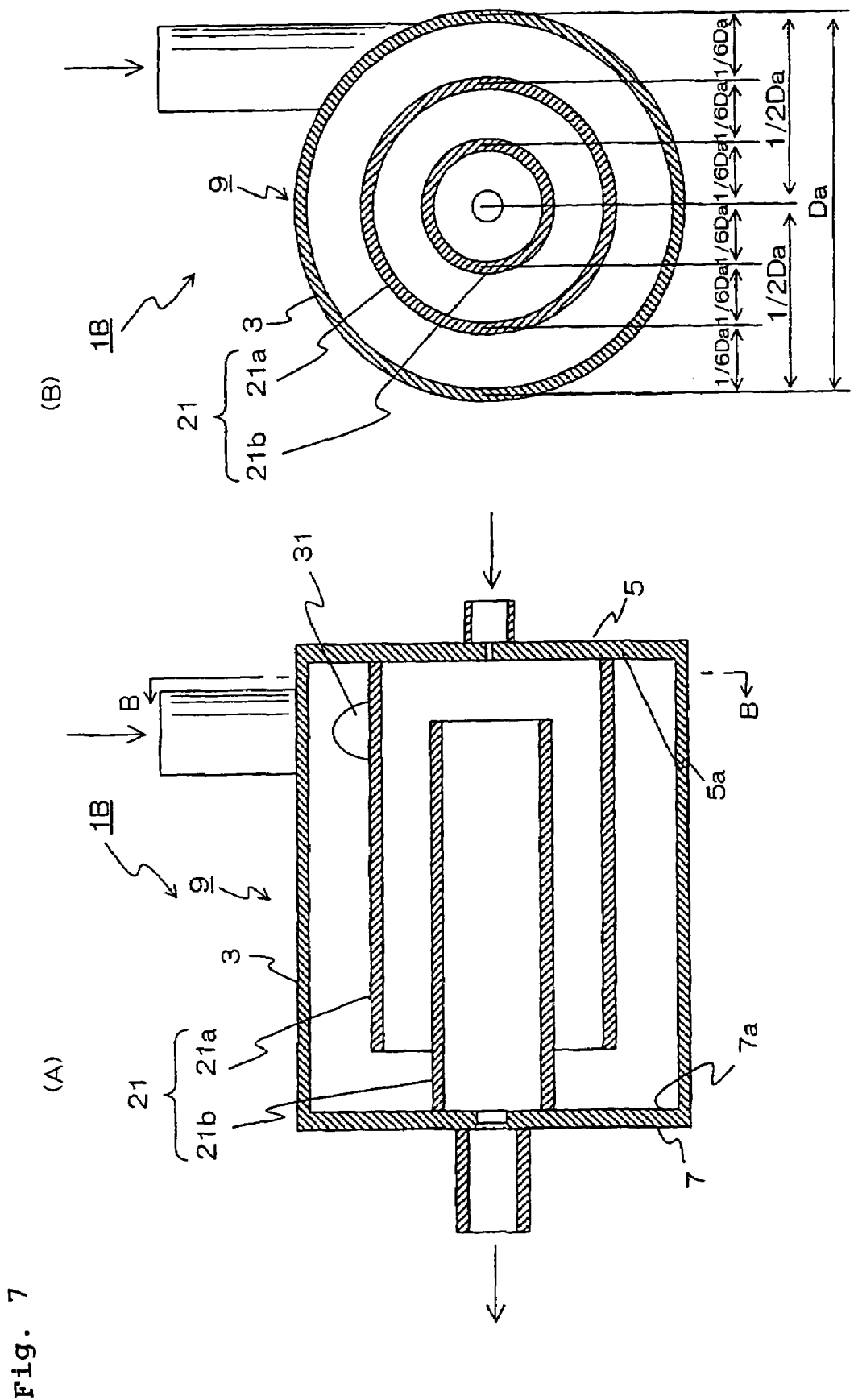

Turning now to FIG. 7, there is shown a specific example where the liquid injection section 31 is disposed in the right hand side in the illustration and the internal cylindrical members 21 are provided doubly. In this specific example, an outer internal cylindrical member 21a is fixed to the circular inner surface 5a in the right hand side, while an inner internal cylindrical member 21b is fixed to the circular inner surface 7a in the left hand side in the illustration. In this specific example, the diameter of the apparatus body 9 is designated as Da, while the diameter of the outer internal cylindrical member 21a is defined to be $\frac{4}{6}Da$ and the diameter of the inner internal cylindrical member 21b is defined to be $\frac{2}{6}Da$. Specifically, the distance between the side wall 3 of the apparatus body 9 and the outer internal cylindrical member 21a is $\frac{1}{6}Da$, the distance between the outer and inner internal cylindrical members 21a and 21b is also $\frac{1}{6}Da$ and the distance from the inner internal cylindrical member 21b to the central axis X of the apparatus body and the internal cylindrical members is also $\frac{1}{6}Da$. It has been confirmed by the experiment that under such a condition, a volume of gas and liquid is discharged from the left hand side in the illustration.

Figure 8:
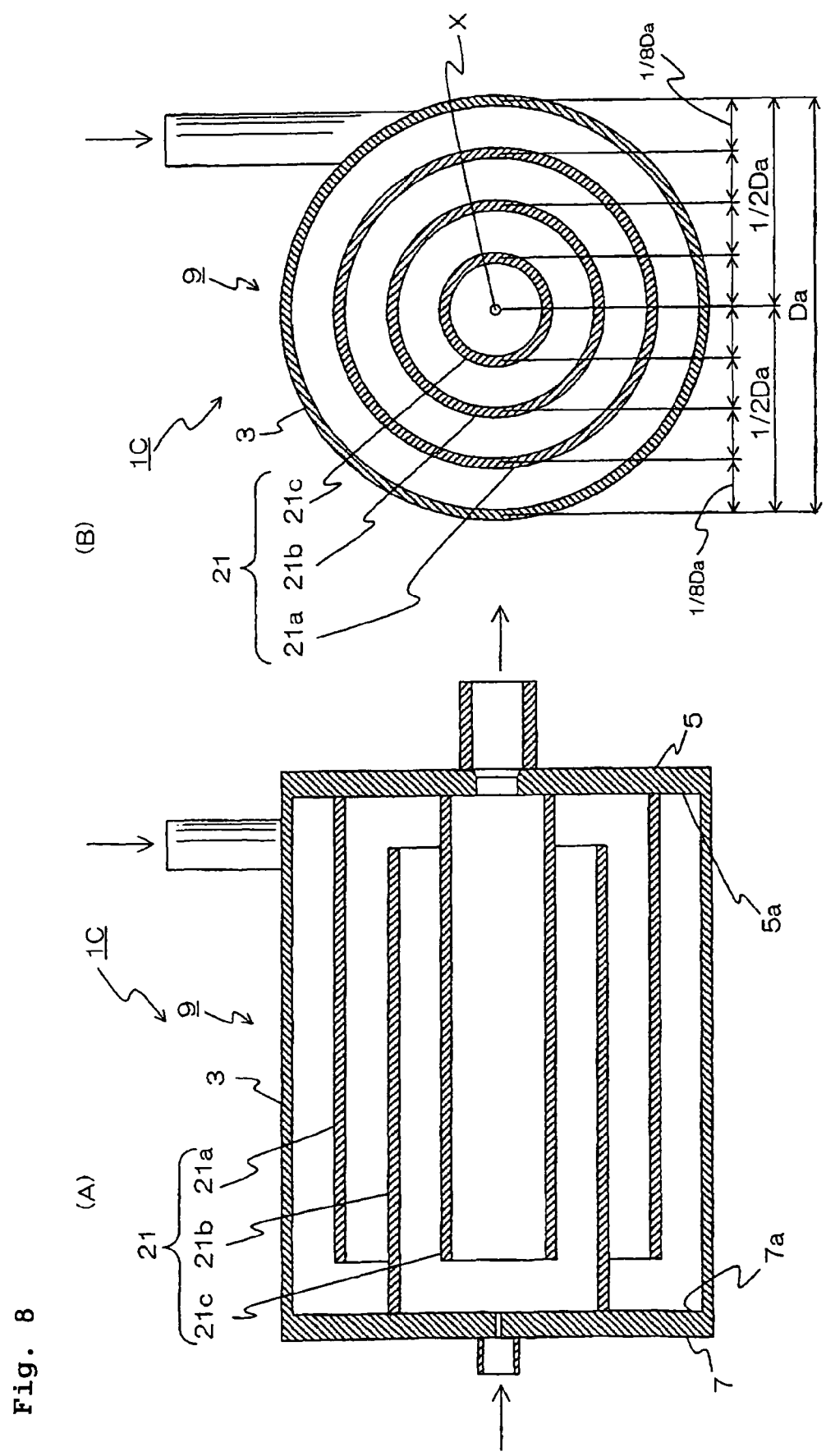

Further, FIG. 8 shows a specific example where the liquid injection section is disposed in the right hand side in the illustration and additionally the internal cylindrical members are provided in a triple fashion. In this specific example, an outer internal cylindrical member 21a is fixed to the circular inner surface 5a in the right hand side, a middle internal cylindrical member 21b is fixed to the circular inner surface 7a in the left hand side, and an inner internal cylindrical member 21c is fixed to the circular inner surface 5a in the right hand side in the illustration. In this specific example, the diameter of the apparatus body 9 is designated as Da, while the diameter of the outer internal cylindrical member 21a is defined to be ⁶⁄₈Da, the diameter of the middle internal cylindrical member 21b is defined to be ⁴⁄₈Da and the diameter of the inner internal cylindrical member 21c is defined to be ²⁄₈Da. Specifically, the distances between the respective components ranging from the side wall 3 of the apparatus body 9 via respective internal cylindrical members 21 to the central axis X of the apparatus body 9 are all ⅛Da, respectively. It has been confirmed by the experiment that under such a condition, a volume of gas and liquid mixture is discharged from the right hand side in the illustration.

Figure 9:
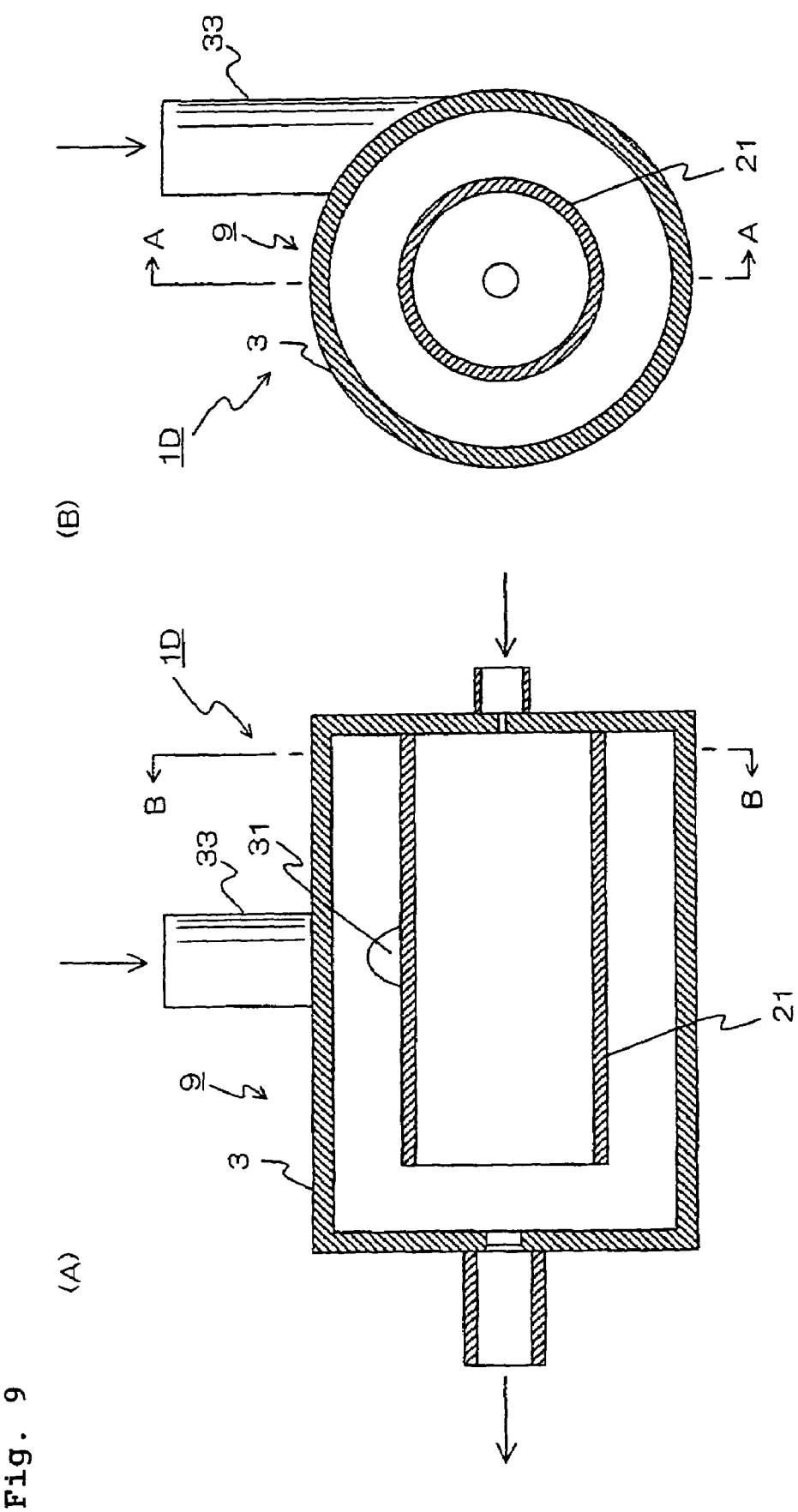

As described above, it has been confirmed by the experiment that the discharge direction of a volume of gas and liquid mixture can be switched as desired by setting the distance between the apparatus body 9 and the internal cylindrical member 21 and the distance between respective internal cylindrical members 21 relative to each other all at a value determined by dividing the diameter of the side wall 3 of the apparatus body 9 by a multiple of 2 or 3. The above fact can apply not only to the case where the liquid injection section 31 is located in the right hand side of the apparatus body 9 but also to the case where the liquid injection section 31 is located in the left hand side of the apparatus, and in this regard, FIG. 9 illustrates a case of a modified air bubble generation apparatus 1 of FIG. 1 where specifically the liquid injection section 31 and the liquid injection pipe 33 are disposed in a central region of the apparatus body 9 in the longitudinal direction. Providing the internal cylindrical member 21 within the internal space can improve the degree of freedom in designing a position of the liquid injection section 31 and consequently more flexible design is feasible in the application of the air bubble generation apparatus. That is, in the application of the present invention to a shower head used in a bath room, for example, the liquid injection section 31 and the liquid injection pipe 33 may be positioned as desired in a relationship to a handle of the shower head, and so the comfortable design may be available to the conventional shower head.

Second Embodiment

Figure 10:
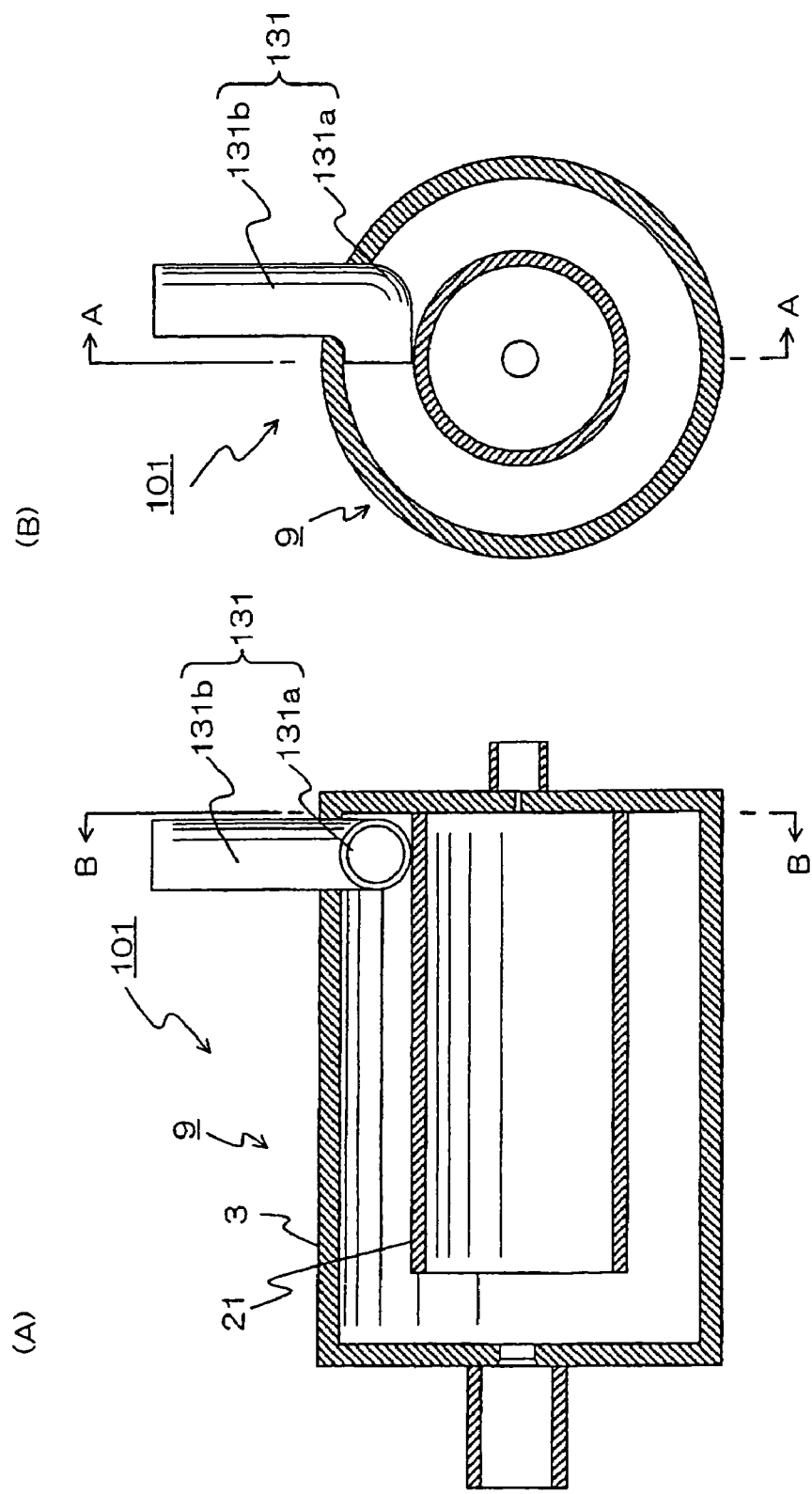

Turning now to FIG. 10, an air bubble generation apparatus 101 according to a second embodiment of the present invention will be described. The illustrated embodiment has a lot of common components with the first embodiment as shown in FIG. 1. Accordingly, any description of the common components will be herein omitted. What makes the illustrated embodiment different from the first embodiment is a structure of a liquid injection section 131. The liquid injection section 131 of the illustrated embodiment employs a tubular member that has been bent in the L-shape.

The liquid injection section 131 comprises a first tubular segment 131a open into the internal space of the apparatus body 9 and a second tubular segment 131b to be connected to an external pressurized fluid source. The first tubular segment 131a is open toward a circumferential direction with respect to the tubular space between the side wall 3 and the internal cylindrical member 21. In addition, the second tubular segment 131b is inserted so as to extend generally vertically relative to the surface of the side wall 3 of the apparatus body 9 and bent at a right angle at a location where the tubular section 131b has just entered into the internal space. Having the liquid injection section 131 configured in the above fashion may improve the degree of freedom in designing a position where the liquid injection section 131 is to be placed, while the object that the liquid should be injected circumferentially with respect to the apparatus body 9 can be still achieved.

Third Embodiment

Figure 11:
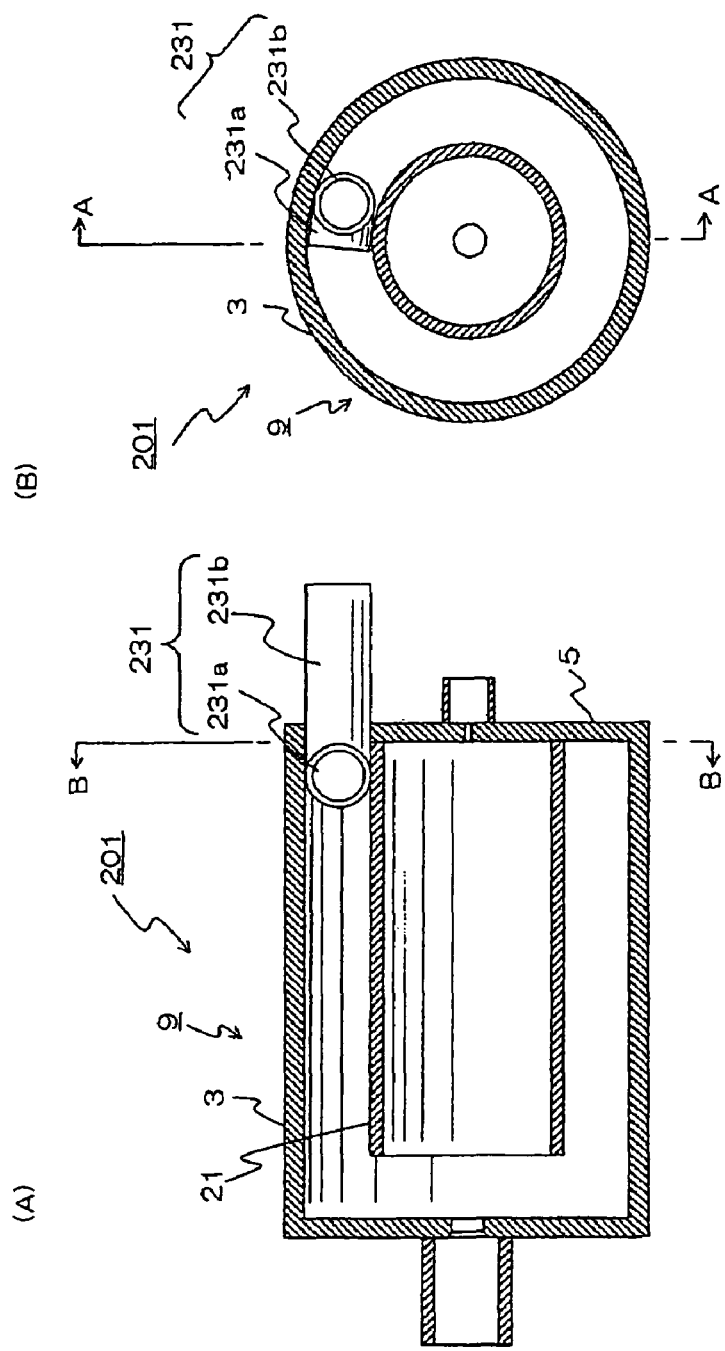

Turning now to FIG. 11, an air bubble generation apparatus 201 according to a third embodiment of the present invention will be described. The illustrated embodiment has a lot of common components with the first embodiment as shown in FIG. 1. Accordingly, any description of the common components will be herein omitted. What makes the illustrated embodiment different from the first embodiment is a structure of a liquid injection section 231, wherein the liquid injection section 231 of the illustrated embodiment uses a tubular member that has been bent in the L-shape. In addition, although the illustrated embodiment is partially common with the second embodiment but different from that in the location where the liquid injection section 231 is arranged.

Specifically, the liquid injection section 231 comprises a first tubular segment 231a open into the internal space of the apparatus body 9 and a second tubular segment 231b to be connected to an external pressurized fluid source (omitted in the illustration). The second tubular segment 231b is, differently from the one in the second embodiment, inserted so as to extend from the surface of the end wall 5 of the apparatus body 9 substantially vertically relative to the circular inner surface 5a and bent at a right angle toward a circumferential direction at a location where the tubular section 231b has just entered into the internal space. Accordingly, the second tubular segment 231a would be open toward the circumferential direction with respect to the tubular space between the apparatus body 9 and the internal cylindrical member 21. Having the liquid injection section 231 configured in the above fashion may improve the degree of freedom in designing the position where the liquid injection section 231 is to be placed, while the object that the liquid should be injected circumferentially with respect to the apparatus body 9 can be still achieved. The above configuration is especially advantageous in case the placement of the liquid injection section 231 in the side wall 3 of the apparatus body 9 is somehow inhibited.

Fourth Embodiment

Figure 12:
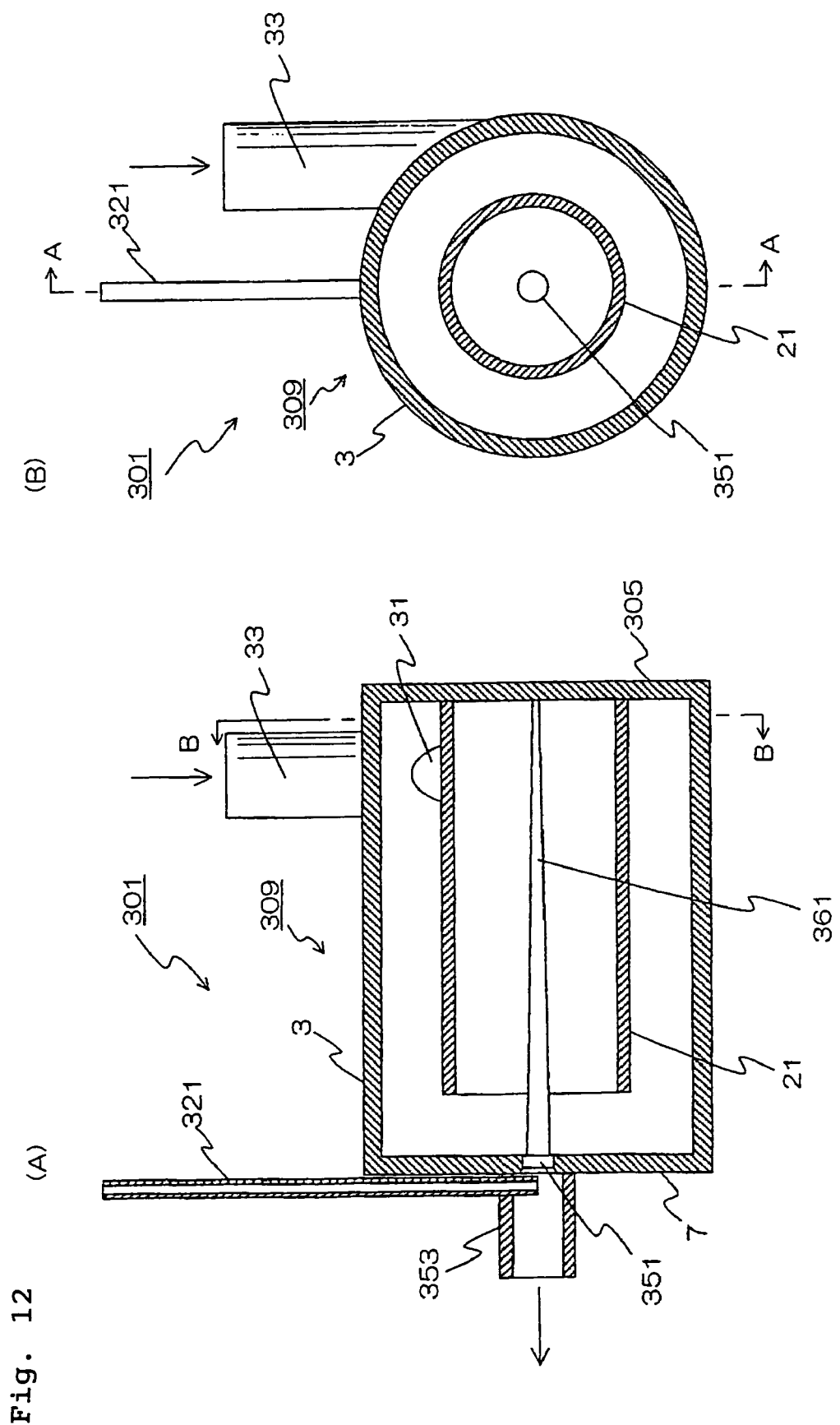

Turning now to FIG. 12, an air bubble generation apparatus 301 according to a fourth embodiment of the present invention will be described. The illustrated embodiment has a lot of common components with the first embodiment as shown in FIG. 1. Accordingly, any description of the common components will be herein omitted. What makes the illustrated embodiment different from the first embodiment is a structure of the gas introduction port and a structure of the gas and liquid mixture discharge port. The gas and liquid mixture discharge port is also serving as the gas introduction port, that is, they are not provided separately. Accordingly, in the following description, a unit of these ports is referred to as the gas and liquid mixture discharge port for the sake of convenience.

The configuration of the gas and liquid mixture discharge port 351 is similar to that as shown in FIG. 1 with no particularly different structure than that. However, in the illustrated embodiment, a gas introduction pipe 341 is arranged in the proximity of the gas and liquid mixture discharge port 351. Specifically, a tip portion of the gas introduction pipe 341 penetrates through a gas and liquid mixture discharge pipe 353 and into the central region of the gas and liquid mixture discharge port 351. The other end of the gas introduction pipe 321 is in communication with the atmosphere or other gas sources (omitted in the illustration).

An operation specific to the air bubble generation apparatus 301 according to the illustrated embodiment will now be described. Initially, a predetermined volume of liquid is injected from the liquid injection section 31 via the liquid injection pipe 33. Once the internal space of an apparatus body 309 has been filled with the volume of liquid, a volume of liquid within the tubular space of the internal space makes a spinning motion in a clockwise direction viewed from one of end walls 305 side, as is the case with FIG. 3(B). At that time, a centrifugal force F from the spinning motion is exerted on the liquid. The liquid, as it is spinning, flows along a direction toward the other end wall 7. The volume of liquid that has flown to the region adjacent to the other end wall 7 then flows into the inside of the internal cylindrical member 21, while continuously making the spinning motion. The centrifugal force F from the spinning motion is similarly exerted on the liquid that has flown into the inside of the internal cylindrical member 21, and the liquid is forced along the inner circumferential wall of the internal cylindrical member 21 back into the region adjacent to the one end wall 305. Subsequently, the volume of liquid that has reached the proximity of the one end wall 305 now flows toward the other end wall 7 along the central region of the internal cylindrical member 21. At that time, the liquid, which is under the centrifugal force F from the spinning motion, produces a condition with relatively reduced pressure in the central region of the internal cylindrical member, and if there is relatively high pressure existing externally, then a volume of gas will be introduced from the gas introduction port 321. Thus introduced volume of gas forms a vortex flow of gas 361 within the volume of liquid and then reaches the one end wall 305.

At that time, the liquid and the vortex flow of gas 361 become suddenly unstable at the gas and liquid mixture discharge port 351 and the vortex flow of gas is forced to be cut apart thereby generating a large amount of fine air bubbles. In addition, the air bubbles in the volume of gas and liquid mixture is cut and refined into much finer air bubbles in the gas and liquid mixture discharge pipe 353. Furthermore, as the volume of gas and liquid mixture exits the gas and liquid mixture discharge pipe 353 to the outside, the air bubbles are further cut and refined due to a differential mass relative to the external environment (such as atmosphere or liquid) and resultantly a large amount of ultra-fine air bubbles can be generated.

According to the configuration as disclosed above, the structure of the apparatus body can be simplified and thus the flexibility in designing the air bubble generation apparatus can be improved. It is to be appreciated that although the gas introduction pipe 321 is inserted from the direction normal to the central axis of the gas and liquid mixture discharge port 351 in the illustrated embodiment, the present invention is not limited to that but the gas introduction pipe 321, in one example, may be arranged along the central axis of the gas and liquid mixture discharge port 351.

Fifth Embodiment

Figure 13:
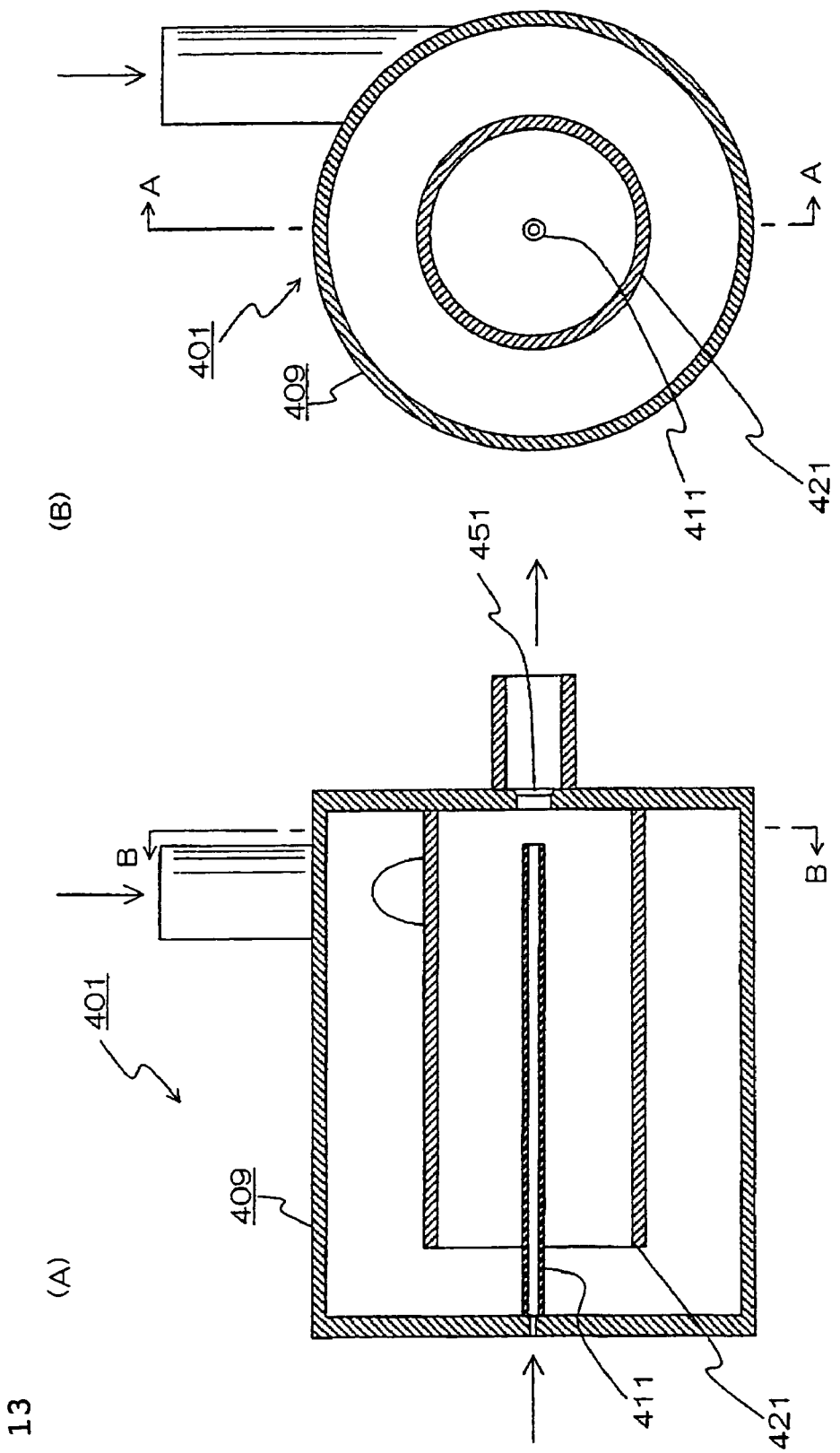

Turning now to FIG. 13, a fifth embodiment of the present invention will be described. In an air bubble generation apparatus 401 according to this embodiment, an elongated auxiliary pipe 411 is disposed in a central region of an apparatus body 409. This auxiliary pipe 411 serves, upon introduction of a volume of gas from the outside, to guide the volume of gas to the proximity of a gas and liquid mixture discharge port 451. Thus, guiding the volume of gas to the proximity of the gas and liquid mixture discharge port 451 allows air bubbles to be generated in much enhanced manner from the aspect of stability.

Sixth Embodiment

Figure 14:
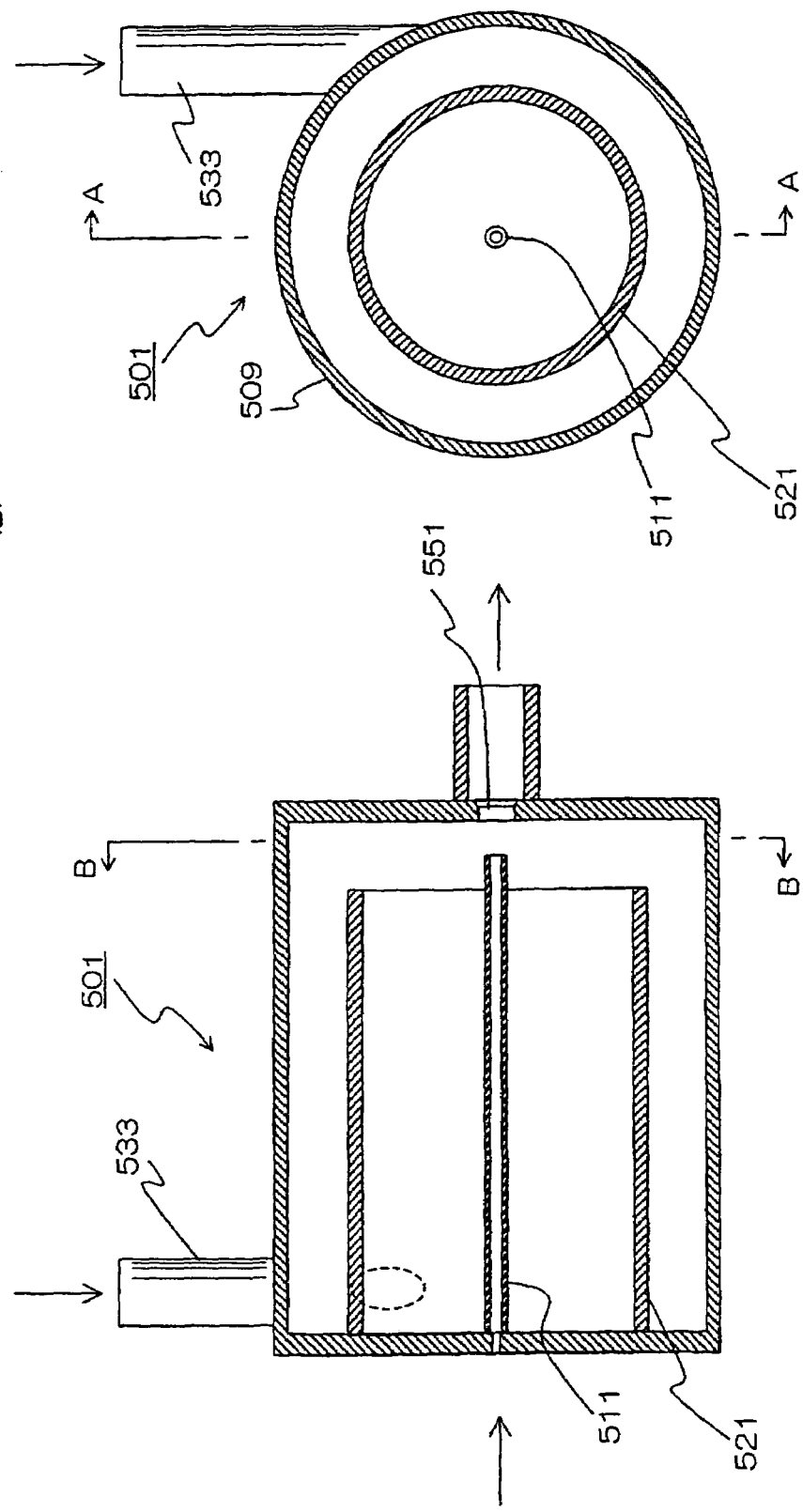

Turning now to FIG. 14, a sixth embodiment of the present invention will be described. Also in an air bubble generation apparatus 501 according to this embodiment, an elongated auxiliary pipe 511 is disposed in a central region of an apparatus body 509, as is the case with the air bubble generation apparatus 401 as shown in FIG. 13. Thus, the air bubble generation apparatus 501 can operate similarly to the air bubble generation apparatus 401. However, in the illustrated embodiment, an internal cylindrical member 521 has a wider diameter. In association with that, a distance between an inner circumferential surface of the apparatus body 509 and an outer circumferential surface of the internal cylindrical member 521 is consequently narrowed, and thus correspondingly a diameter of a liquid injection pipe 533 is reduced. With those alternations added as described above, resultantly a gas and liquid mixture discharge port 511 is arranged in an opposite side of the liquid injection pipe 533. In this way, the discharge direction of a volume of gas and liquid mixture can be controlled by changing the diameter of the internal cylindrical member 521.

Seventh Embodiment

Figure 15:
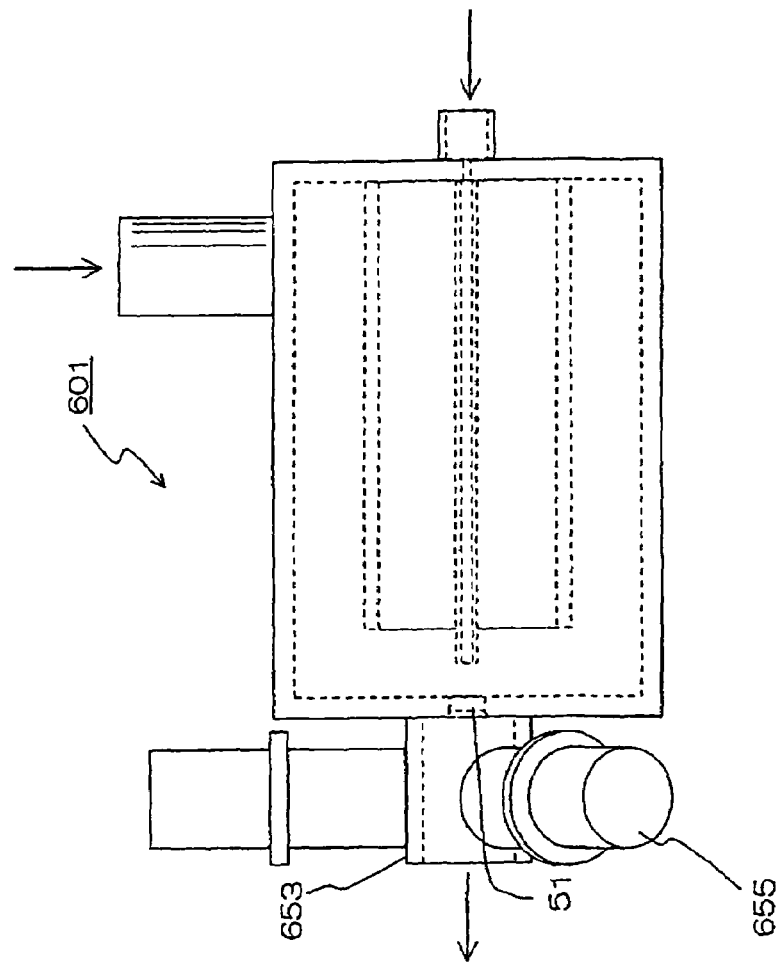

Turning now to FIG. 15, a seventh embodiment will be described. This embodiment is different from respective embodiments described above in that a piezoelectric ultrasonic vibrator 655 is disposed on an outer circumferential surface of a gas and liquid mixture discharge pipe 653. This ultrasonic vibrator 655 is provided for the purpose of applying supersonic vibrations to the gas and liquid mixture discharge pipe 653 to refine air bubbles to be much finer. The ultrasonic vibrator 655 used in this embodiment is the one having a circular column configuration, and three of such ultrasonic vibrators 655 are spaced equally at every 120 degrees with their end surfaces positioned toward a normal line with respect to the outer circumferential surface of the gas and liquid mixture discharge pipe. It is to be appreciated that the number of ultrasonic vibrator used is not limited to three but one or two, or more than three ultrasonic vibrators may be used.

Eighth Embodiment

Figure 16:
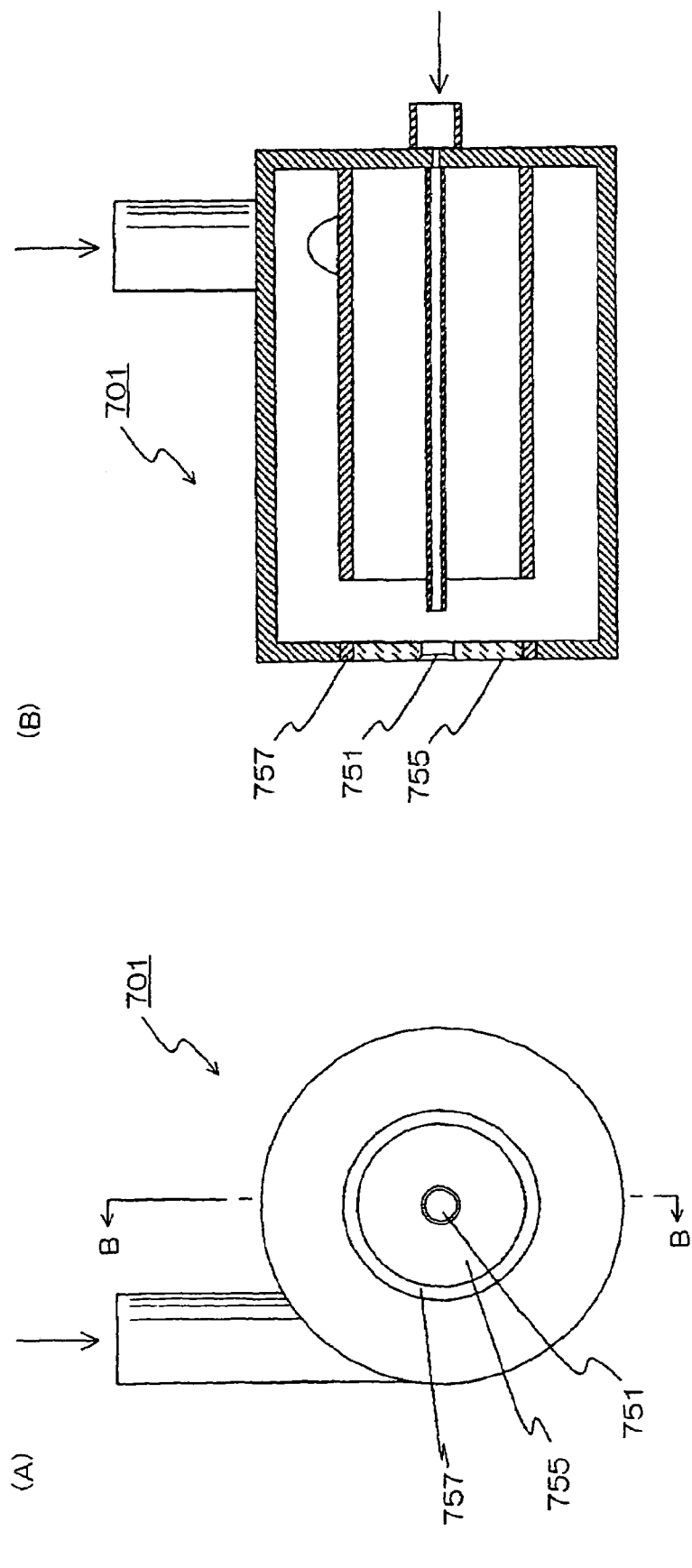

Turning now to FIG. 16, an eighth embodiment will now be described. An air bubble generation apparatus 701 according to this embodiment is similar to the seventh embodiment in that it has a piezoelectric ultrasonic vibrator 755, but a configuration of the piezoelectric ultrasonic vibrator 755 is different from that of the seventh embodiment. Specifically, the ultrasonic vibrator 755 is disposed in a circular configuration around a gas and liquid mixture discharge port 751 in the illustrated embodiment. In this way, arranging the ultrasonic vibrator 755 in a region surrounding the gas and liquid mixture discharge port 751 can help refine air bubbles to be much finer. It is to be noted that an annular buffer member 757 is disposed around the ultrasonic vibrator 755 so as to prevent the vibrations from the ultrasonic vibrator 755 from transferring across the apparatus entirely.

Ninth Embodiment

Turning now to FIG. 17, a ninth embodiment will be described. A gas and liquid mixture generation apparatus 801 according to this embodiment employs a piezoelectric ultrasonic vibrator which constitutes an entire end wall in which a gas and liquid mixture discharge port 851 is formed. This configuration also contributes to the refining of the air bubbles as in the case of embodiment shown in FIG. 16. Further in the illustrated embodiment, the end wall that is constructed with a simple disc-like ultrasonic vibrator 855 is easier to fabricate than the end wall of the structure as shown in FIG. 16. It is to be noted that an annular buffer member 857 is disposed around the ultrasonic vibrator 855 so as to prevent the vibrations from the ultrasonic vibrator 855 from transferring across the apparatus entirely.

Tenth Embodiment

Turning now to FIG. 18, a tenth embodiment will be described. An air bubble generation apparatus 901 according to this embodiment is different from respective embodiments described above in that the gas and liquid mixture discharge pipe is constructed with a magnetostrictive ultrasonic vibrator 955. This ultrasonic vibrator 955 comprises a tubular member 957 made of metallic magnetic body, an electrically conductive coil 959 to be wound around an outer circumferential surface of the tubular member 957 and a pair of flanges 961 for clamping this electrically conductive coil 959 from both sides. In the ultrasonic vibrator 955 having such a structure, applying an alternating current at a high frequency to the electrically conductive coil 959 causes the expansion and contraction of the tubular member 957 made of the metallic magnetic body to effect the ultrasonic vibrations. This may facilitate the refining of the air bubbles to be much finer during the discharging process of the gas and liquid mixture. It is to be noted that the ultrasonic vibrator 955 is mounted to the end wall of the apparatus body via an annular buffer member 963 disposed in an end of the tubular member 957 so as to prevent the vibration from the ultrasonic vibrator 955 from transferring across the apparatus entirely.

Structure of a Mist Generation Apparatus

A mist generation apparatus as one implementation of the gas and liquid mixture generation apparatus will be now described. Although a structure of the mist generation apparatus is similar to that of the air bubble generation apparatus according to the first embodiment as shown in FIGS. 1-9, the components for receiving the liquid and those for receiving the gas should be interchanged. That is, a volume of gas or first fluid is introduced from a first fluid introduction section (hereinafter referred to as a "gas introduction section") and a volume of liquid or second fluid is introduced from a second fluid introduction section (hereinafter referred to as a "liquid introduction port"). For example, the gas may be air and the liquid may be water. In this arrangement, mist of minute liquid droplets can be generated from the gas and liquid mixture discharge port. Based on that, in order to translate the description of the air bubble generation apparatus to fit in the description of the mist generation apparatus in the foregoing description of each of those embodiments above, the term, gas, should be read in place of liquid and the term, liquid, in place of gas and also the term, mist, in place of air bubbles for providing substantially the description of the mist generation apparatus.

Operation of a Mist Generation Apparatus

Now taking FIG. 3 for reference, an operation specific to a mist generation apparatus 1 according to the illustrated embodiment will be described. Initially, a predetermined volume of gas is injected from the gas injection section 31 via a gas injection pipe 33 serving as the first fluid introduction section. Once the internal space of the apparatus body 9 has been filled with the gas, a volume of gas within the tubular space of the internal space makes a spinning motion in a clockwise direction viewed from the one end wall 5 side, as shown in FIG. 3(B). At that time, a centrifugal force F from the spinning motion is exerted on the gas. The gas, as it is spinning, flows along a direction toward the other end wall 7. The volume of gas that has flown to the region adjacent to the other end wall 7 then flows further into the inside of the internal cylindrical member 21, while continuously making a spinning motion. The centrifugal force F is similarly exerted on the gas that has flown into the inside of the internal cylindrical member 21, and the gas is forced along the inner circumferential surface of the internal cylindrical member 21 back into the region adjacent to the one end wall 5. Subsequently, the volume of gas that has reached the proximity of the one end wall 5 now flows toward the other end wall 7 along the central region of the internal cylindrical member 21. At that time, the gas, which is under the centrifugal force F from the spinning motion, produces a condition with relatively reduced pressure in the central region of the internal cylindrical member, and if there is relatively high pressure existing externally, then a volume of liquid will be introduced from the liquid introduction port 41 serving as the second fluid introduction section. Thus introduced volume of liquid forms a vortex flow of liquid 61 within the volume of gas and then reaches the region adjacent to the other end wall 7 with the aid of the flow of gas in the spinning motion directed to the other end wall 7.

At that time, the gas and the vortex flow of liquid 61 becomes suddenly unstable at the gas and liquid mixture discharge port 51 and the vortex flow of liquid 61 is forced to be cut apart to thereby generating a large amount of finely atomized mist. In addition, the mist in the volume of gas and liquid mixture is cut and refined into much finer particles of mist in the gas and liquid mixture discharge pipe 53. Furthermore, as the volume of gas and liquid mixture exits the gas and liquid mixture discharge pipe 53 to the outside, the particles of mist are further cut and refined into still finer particles due to a differential mass relative to the external environment (such as atmosphere or liquid) and resultantly a large amount of ultra-fine particles of mist can be generated.

As described above, the mist generation apparatus of the present invention functions similarly to the air bubble generation apparatus. Further, variation in mist generation property as well as variation in discharge direction of the gas and liquid mixture resulting from the specific dimensions of respective components is also similar to those in the air bubble generation apparatus.

In addition, each of the embodiments as shown in FIGS. 10-18 can also serve as the mist generation apparatus by interchanging the introduction sections between the liquid and the gas. It is to be noted that if the elongated auxiliary pipe 411 is disposed in the central region of the apparatus body 409 as shown in FIG. 13, this arrangement is more advantageous for the mist generation apparatus. This is for the reason as mentioned below. That is, since the liquid has a specific gravity that is greater than that of the gas, the liquid may be occasionally subject to the centrifugal force F from the spinning flow and moved out of the spinning gas stream, depending on the specific configuration of the apparatus body. In such an event, the liquid could not reach the gas and liquid mixture discharge port 451, leading to lowered mist generation efficiency. In contrast to that, arrangement of the auxiliary pipe 411 allows a volume of liquid to be introduced in the proximity of the gas and liquid mixture discharge port so as to allow the mist to be generated in much efficient manner.

Industrial Applicability

A gas and liquid mixture generation apparatus according to the present invention, for example, those serving as an air bubble generation apparatus, may be applicable to the industrial field for cleaning the water in the sea, rivers and lakes as well as the contaminated soil and for modifying the liquid property and further applicable to other industrial fields, including fisheries industries, medical industries, cosmetic and health-care appliance industries and the like. Further, the gas and liquid mixture generation apparatus of the present invention, for example, those serving as a mist generation apparatus, may be applicable to the desalination of the sea water and salt refining associated therewith, the refining of fine powdery materials, the environmental control of greenhouse cultivation facility and the like, the plant environmental sanitation control, the spatial environment control, the disaster prevention and fire control facilities, the health-care equipment, the recycling business and the like.

The invention claimed is:

1. A gas and liquid mixture generation apparatus comprising:
    an apparatus body having a circular column-like internal space defined by a cylindrical inner surface and circular inner surfaces;
    at least one internal cylindrical member disposed within said internal space away from said cylindrical inner surface;
    a first fluid introduction section for injecting a volume of first fluid into a tubular space between said cylindrical inner surface and said internal cylindrical member toward a circumferential direction; and
    a second fluid introduction section for introducing a volume of second fluid and a gas and liquid mixture discharge port, which are disposed in said circular inner surfaces, wherein
    either one of fluids selected from a group consisting of a liquid and a gas is introduced from said first fluid introduction section, and the other of said fluids is introduced from said second fluid introduction section, and wherein
    at least two internal cylindrical members having different diameters from each other are disposed in said apparatus, said at least two internal cylindrical members fixed to one and the other of said circular inner surfaces alternately in order corresponding to respective diameter sizes.

2. A gas and liquid mixture generation apparatus in accordance with claim 1, wherein said internal cylindrical member is concentric with a central axis of said circular column-like internal space and fixed to said circular inner surface.

3. A gas and liquid mixture generation apparatus in accordance with claim 1, wherein a spacing between said cylindrical inner surface and said internal cylindrical member and a spacing between respective internal cylindrical members are all equal.

4. A gas and liquid mixture generation apparatus in accordance with claim 3, wherein said spacing has a value determined by dividing a radius of said cylindrical inner surface by a multiple of 2 or a multiple of 3.

5. A gas and liquid mixture generation apparatus in accordance with claim 1, wherein said second fluid introduction section is formed in a central region of said circular inner surface.

6. A gas and liquid mixture generation apparatus in accordance with claim 1, wherein said gas and liquid mixture discharge port is formed in a central region of said circular inner surface.

7. A gas and liquid mixture generation apparatus in accordance with claim 1, wherein said second fluid introduction section and said gas and liquid mixture discharge port are formed respectively in different circular inner surfaces from each other.

8. A gas and liquid mixture generation apparatus in accordance with claim 1, wherein said gas and liquid mixture discharge port comprises a combination of a circular column-like aperture formed in said circular inner surface side of said apparatus body with a circular truncated cone-like opening expanding toward an external side of said apparatus body.

9. A gas and liquid mixture generation apparatus in accordance with claim 1, further comprising a tubular gas and liquid mixture discharge pipe disposed around said gas and liquid mixture discharge port outside said apparatus body.

10. A gas and liquid mixture generation apparatus in accordance with claim 1, wherein said first fluid introduction section is disposed in either one of said cylindrical inner surface or said circular inner surface.

11. A gas and liquid mixture generation apparatus in accordance with claim 1, wherein said first fluid introduction section has a circular cross section, whose diameter is equal to a spacing between said cylindrical inner surface and said internal cylindrical member.

* * * * *